United States Patent
Fujimoto

(10) Patent No.: US 6,674,217 B1
(45) Date of Patent: Jan. 6, 2004

(54) VIBRATION MEMBER USING ELECTRO-MECHANICAL ENERGY CONVERSION ELEMENT AS DRIVING SOURCE, VIBRATION WAVE DRIVING APPARATUS USING VIBRATION MEMBER AS DRIVING SOURCE AND APPARATUS PROVIDED WITH VIBRATION WAVE DRIVING APPARATUS

(75) Inventor: Kosuke Fujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/625,851

(22) Filed: Jul. 26, 2000

(30) Foreign Application Priority Data

Jul. 28, 1999 (JP) ............................. 11-214023

(51) Int. Cl.$^7$ ............................................. H01L 41/08
(52) U.S. Cl. ............................ 310/323.06; 310/323.04
(58) Field of Search ....................... 310/323.03, 323.04, 310/323.06, 328

(56) References Cited

U.S. PATENT DOCUMENTS

| | | | | |
|---|---|---|---|---|
| 5,025,186 A | * | 6/1991 | Tsukada ................. | 310/323.02 |
| 5,134,333 A | * | 7/1992 | Atsuta ..................... | 310/323.06 |
| 5,172,023 A | * | 12/1992 | Kawai et al. .......... | 310/323.04 |
| 5,256,928 A | * | 10/1993 | Nishikura et al. ...... | 310/323.04 |
| 5,298,829 A | * | 3/1994 | Tsukimoto et al. .... | 310/323.06 |
| 5,300,850 A | * | 4/1994 | Okumura et al. ...... | 310/323.04 |
| 5,684,353 A | | 11/1997 | Fujimoto et al. ........... | 310/323 |
| 5,686,776 A | * | 11/1997 | Takagi et al. .......... | 310/323.04 |
| 5,739,623 A | | 4/1998 | Kanazawa et al. .......... | 310/323 |
| 5,760,529 A | | 6/1998 | Tamai et al. ................. | 310/323 |
| 5,798,598 A | * | 8/1998 | Fujimoto et al. ....... | 310/323.06 |
| 5,821,670 A | | 10/1998 | Tobe et al. ................... | 310/328 |
| 5,949,178 A | | 9/1999 | Tamai et al. ................. | 310/323 |
| 6,107,723 A | | 8/2000 | Fujimoto ............... | 310/323.09 |
| 6,107,724 A | | 8/2000 | Tamai et al. ........... | 310/323.11 |
| 6,175,181 B1 | * | 1/2001 | Shirasaki ............... | 310/323.02 |

FOREIGN PATENT DOCUMENTS

| | | | | |
|---|---|---|---|---|
| JP | 3-70480 | 3/1991 | ............ | H02N/2/00 |
| JP | 8-298793 | 11/1996 | ............ | H02N/2/00 |

OTHER PUBLICATIONS

Official Letter from the Korean Patent Office dated Apr. 16, 2002.

* cited by examiner

Primary Examiner—Mark Budd
(74) Attorney, Agent, or Firm—Fitzpatrick, Cella, Harper & Scinto

(57) ABSTRACT

There is disclosed a vibration member comprising: a driving portion; an elastic member including the driving portion; and an electro-mechanical energy conversion element as a driving source in contact with the elastic member. The electro-mechanical energy conversion element is provided with an alternating signal to generate a plurality of vibrations, and the plurality of vibrations are combined to generate a driving vibration in the driving portion. An ununiformity of rigidity of the vibration member caused by a polarization treatment performed on the electro-mechanical energy conversion element is offset by partially changing the rigidity of the vibration member, so that a stable driving vibration of the vibration member can be outputted.

47 Claims, 19 Drawing Sheets

FIG. 1
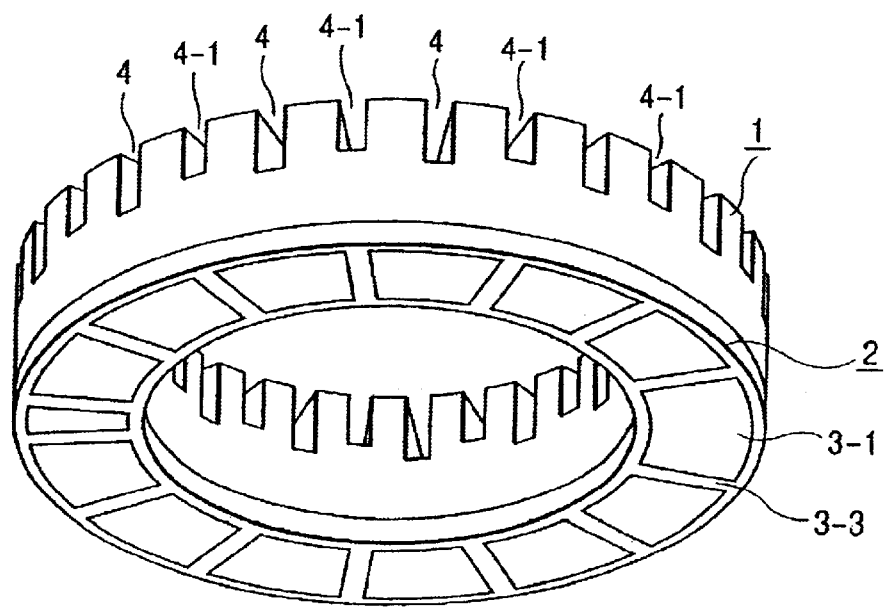
FIG. 2A
FIG. 2B
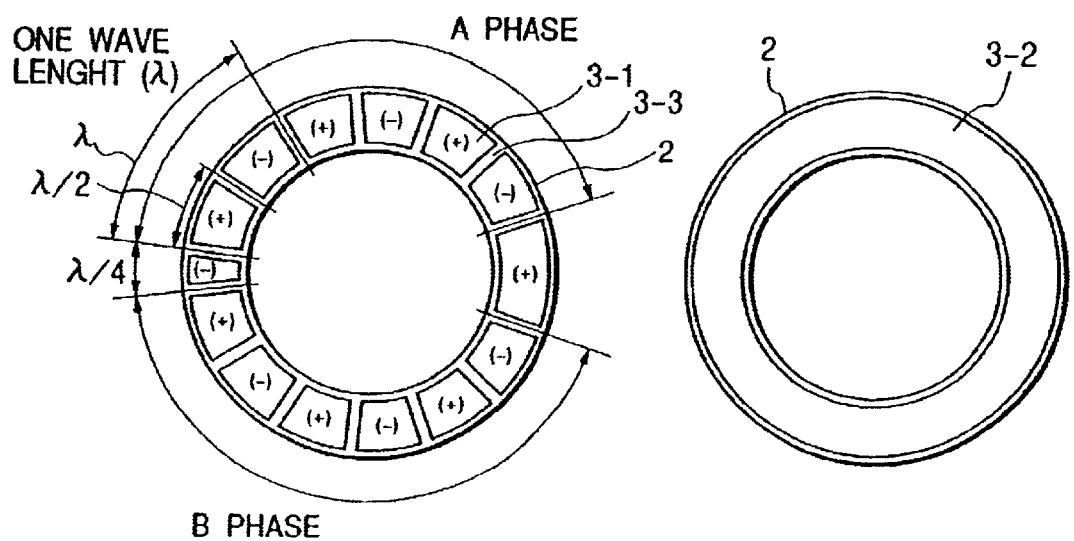

FIG. 17
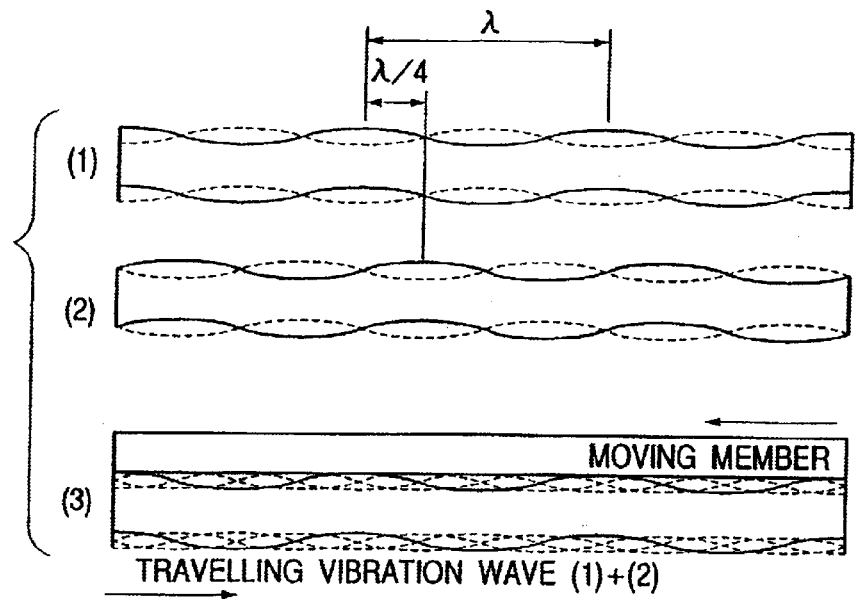
FIG. 18A PRIOR ART
FIG. 18B PRIOR ART
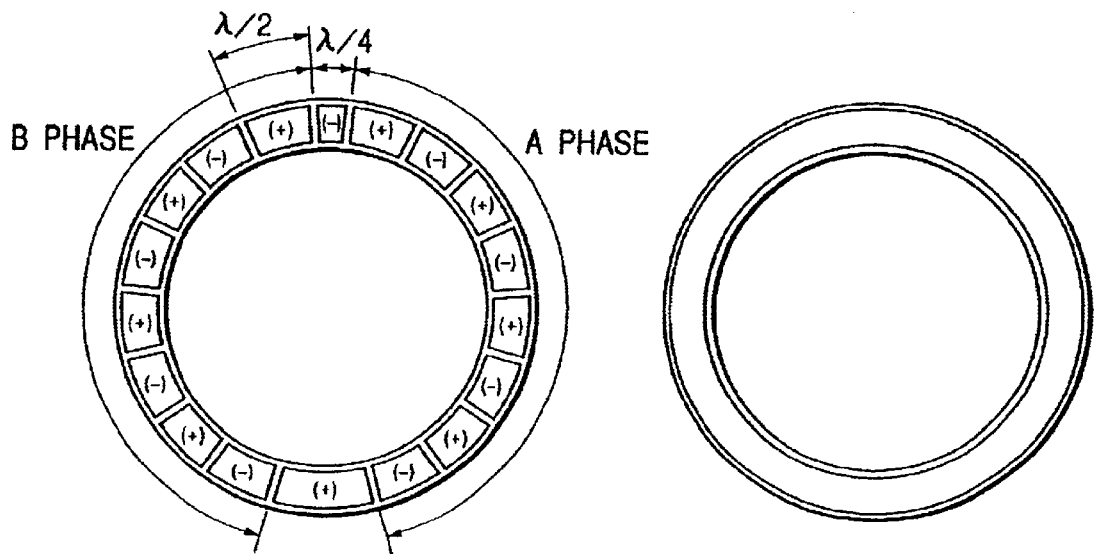

VIBRATION MEMBER USING ELECTRO-MECHANICAL ENERGY CONVERSION ELEMENT AS DRIVING SOURCE, VIBRATION WAVE DRIVING APPARATUS USING VIBRATION MEMBER AS DRIVING SOURCE AND APPARATUS PROVIDED WITH VIBRATION WAVE DRIVING APPARATUS

BACKGROUND OF THE INVENTION

1. Field of the Invention

The present invention relates to a vibration member which uses a piezoelectric element, that is, an electro-mechanical energy conversion element as a driving source to form a driving vibration in an elastic member, a vibration wave driving apparatus which uses the vibration member as a driving source, and an apparatus provided with the vibration wave driving apparatus.

2. Related Background Art

As a vibration wave driving apparatus which uses, as a driving source, a vibration member for forming a driving vibration in an elastic member using a vibration source of a piezoelectric element as an electro-mechanical energy conversion element, there is a vibration wave motor as one system for relatively moving the vibration member and a contact member pressurized to contact the vibration member. The vibration wave motor serves as an actuator which can extract a large torque at a low speed, there is no cogging disposed on an electromagnetic motor, and the vibration wave motor is characterized by little rotation unevenness.

Particularly, in a traveling wave type vibration wave motor, a traveling vibration wave with a uniform vibration amplitude is generated in the elastic member, a moving member as a contact member pressurized to contact the elastic member is continuously driven, and therefore no rotation unevenness is generated in principle.

FIG. 21 is a perspective view of a vibration member of a conventional vibration wave motor.

Numeral 1 denotes an annular elastic member formed of a metal or the like, 2 denotes a piezoelectric element as an annular electro-mechanical energy conversion element, and the piezoelectric element 2 is bonded and fixed to one surface of the elastic member 1 by an adhesive.

For the piezoelectric element 2, electrodes are formed on both surfaces of a piezoelectric member constituted of ceramic subjected to a polarization treatment, voltage applying electrodes 3 are arranged at intervals in a peripheral direction on the surface shown in FIG. 21, and an entire surface electrode (not shown) for covering the entire surface is disposed on the surface bonded to the elastic member 1.

On the other hand, a wear-resistant layer of a wear-resistant friction material or the like is formed on the other surface (the surface opposite to the surface bonded to the piezoelectric element 2) of the elastic member 1, and a moving member (not shown) is pressurized to contact via the wear-resistant layer.

In FIG. 17, (1) to (3) are development diagrams showing a driving principle of a traveling wave type vibration wave motor.

In FIG. 17, (1) shows a first standing wave with a wavelength λ excited in the vibration member (referred to as A phase), and (2) shows a second standing wave with a wavelength λ excited in the vibration member (referred to as B phase). For the shown A and B phases, respective node positions (antinode positions) deviate from each other by a ¼ wavelength. By simultaneously exciting and overlapping these two standing waves with a time phase difference of 90°, a traveling wave with a uniform amplitude can be synthesized as shown in (3) of FIG. 17.

For the vibration member in which the flexural traveling wave is excited in this manner, since a point apart from the neutral surface of flexural displacement performs elliptical movement, by pressing the moving member onto the top surface of the vibration member for contact in the vicinity of a vertex of elliptical movement, the moving member is driven by a friction force acting between the vibration member and the moving member.

For the piezoelectric element bonded to the elastic member constituting the vibration member for exciting the respective standing waves A, B, by forming a plurality of electrodes on a single disc by evaporation or the like and subjecting a plurality of areas to the polarization treatment, two standing waves deviating in phase from each other can be excited by a single piezoelectric element.

FIGS. 18A and 18B show a representative polarization pattern. Respective electrode groups of A and B phases are formed via a non-driving portion with a length of a ¼ wavelength, and in each group, each electrode has a length of a ½ wavelength and the electrodes adjacent to each other are polarized in reverse directions as shown by symbols (+), (−) in FIG. 18A.

The respective electrode groups of A and B phases are short-circuited by means such as a conductive paste and a flexible printed board, a contraction and expansion force is therefore generated in a direction crossing at right angles to a polarization direction by applying a desired voltage between the electrode and a ground electrode on the back surface, and the aforementioned two standing waves are excited at the respective voltages of the A and B phases by applying a flexural moment to the vibration member.

However, in the aforementioned conventional example, when the polarization treatment is performed in order to form adjacent polarized areas in polarization directions opposite to each other in one piezoelectric element, the following problems arise.

FIG. 19 is a developed sectional view of the piezoelectric element of a portion in which the polarization directions in the adjacent polarized areas are opposite to each other. Arrows in FIG. 19 show electric force lines by differences of potentials applied to the respective electrodes during polarization.

As shown in FIG. 19, in a portion apart from a boundary (3) of two electrodes (1) and (2), the electric force lines run substantially in a thickness direction, and the polarization direction also runs along the direction of the electric force lines.

However, many of the electric force lines in the boundary (3) between the adjacent electrodes (1) and (2) run in a direction crossing at right angles to the thickness direction between the adjacent electrodes, instead of the thickness direction. Therefore, the present inventors have clarified that the polarization direction also runs in the direction crossing at right angles to the thickness direction of the piezoelectric element.

On the other hand, a flexural rigidity of the vibration member is determined mainly by the flexural rigidity of the elastic member and the rigidity of the bonded piezoelectric element.

Since the piezoelectric element is bonded to a position apart from the neutral surface of the vibration member in the thickness direction, the rigidity of the direction crossing at right angles to the vibration direction contributes to the flexural rigidity of the vibration member. For the piezoelectric element, a modulus of longitudinal elasticity is anisotropic depending on the applied polarization direction. Specifically, in FIG. 19, when the modulus of longitudinal elasticity of a direction parallel to the polarization direction of an area subjected to a treatment in the (ideal) polarization direction is Y11, and the modulus of longitudinal elasticity of a direction crossing at right angles to the ideal polarization direction is Y33, there is usually a relation of Y11>Y33.

Since polarization is performed substantially in the thickness direction in the vicinity of the middle of the electrodes (1) and (2), the modulus of longitudinal elasticity of the thickness direction is Y11. However, when the adjacent electrodes are polarized in reverse directions, the modulus of longitudinal elasticity of the direction crossing at right angles to the thickness direction is Y33 in the boundary (3). Therefore, the modulus of longitudinal elasticity of the boundary of the electrodes polarized in the reverse directions indicates a smaller value than that of an electrode portion.

If there is partially a difference in the modulus of longitudinal elasticity of the elastic member, the following phenomenon occurs.

Specifically, for the standing wave excited by the elastic member, a propagation speed is determined by the flexural rigidity of each portion of the elastic member, and a line density. When the rigidity or the density is non-uniform, the propagation speed of flexural vibration partially changes, the wavelength of the excited standing wave changes, and wavelength unevenness occurs in some places.

FIG. 20 is a development diagram in which the wavelength unevenness generated by the polarization pattern of the piezoelectric element shown in FIG. 18 is shown centering on a driven portion with a ¼ wavelength.

For the standing wave (wavelength λ) in which the number of waves excited by the A phase electrode group is seven, ideally a vibration antinode corresponds to the middle of the electrode in the area of the A phase electrode group, and the vibration antinode coincides in position with the boundary of the electrodes in the area of the B phase electrode group.

Additionally, as shown in FIG. 19, since the modulus of longitudinal elasticity in the middle of the electrode (1) of the piezoelectric element is larger than the modulus of longitudinal elasticity of the boundary (3) of the electrodes (1) and (2), for the A phase standing wave, the flexural rigidity is high in the A phase electrode group area of the vibration member in which the antinode position of the standing wave is in the middle of the electrode of the piezoelectric element, and the flexural rigidity is low in the B phase electrode group area in which the antinode position is between the electrodes of the piezoelectric element.

Therefore, in the A phase area the vibration propagation speed increases and the wavelength is lengthened, while in the B phase area the vibration propagation speed decreases and the wavelength is therefore shortened.

Similarly, in the standing wave excited by the B phase electrode group, conversely, the wavelength is short in the A phase area and the wavelength is long in the B phase area.

As described above, since there is unevenness in the wavelength of each of the respective A and B standing waves each with the number of waves of seven, and there is deviation from a position phase λ/4, it is seen from FIG. 20 that amplitude unevenness occurs in the amplitude of the synthesized traveling wave.

When there is unevenness in the traveling wave amplitude, unevenness occurs in the driving speed of the moving member. Therefore, there is unevenness in the press contact force of the moving member, or a contact surface is incompletely flat, and speed unevenness is therefore caused in the moving member by the relative position of the moving member and vibration member.

Moreover, the moving member slides in areas different in feeding speed at an equal speed, an area in which feeding forces are compensated each other is therefore produced, and efficiency is deteriorated by friction loss.

Furthermore, since the press contact force acting between the moving member and the vibration member differs with the position of the vibration member, deviation friction is caused on the friction surface of the vibration member, and the life of the motor is shortened as a result.

Moreover, in a conveying apparatus in which a powder material or another material small as compared with the wavelength is directly laid on the vibration member and conveyed, since the movement speeds of a plurality of waves are not averaged, the powder material gathers in a place where the traveling wave amplitude is small, or another problem arises, and smooth conveyance is inhibited.

The aforementioned amplitude unevenness not only depends on the polarization direction of the piezoelectric element but also occurs, for example, in the following situation.

Specifically, as the constitution of the vibration member, in addition to the single piezoelectric element, as shown in FIG. 22, a plurality of piezoelectric elements each having a length of ½ wavelength polarized in a single direction are bonded to the elastic member, or the length of the piezoelectric element is set to ¼ wavelength.

In this case, since polarization is performed in the single direction in each piezoelectric element, the aforementioned problem of the difference in the modulus of elasticity by the polarization direction does not occur, but in a gap between the piezoelectric elements a sectional secondary moment is reduced as compared with other areas. Therefore, the aforementioned vibration amplitude unevenness is caused.

Even with the single piezoelectric element, as shown in FIG. 23, by applying the electrode on the entire surface, performing polarization to provide a uniform polarity, and polishing the electrode with a grindstone, a metal saw or the like to divide the electrode into a plurality of electrodes, a sectional shape has a partially cut groove 3-3, the rigidity between the electrodes is deteriorated, and the similar vibration amplitude unevenness is caused.

Moreover, even by dividing the electrode into a plurality of electrodes in the aforementioned method in an non-polarized state, bonding the piezoelectric element to the vibration member and subsequently performing the polarization treatment to vary the polarity, the similar result is obtained.

An object of the present invention is to provide a vibration member using an electro-mechanical energy conversion element as a vibration source in which wavelength unevenness generated in a plurality of standing waves is removed and a driving wave as a combined wave of the plurality of standing waves can be stabilized, a vibration wave driving apparatus using the vibration member as a driving source, and an apparatus provided with the vibration wave driving apparatus.

SUMMARY OF THE INVENTION

According to one aspect of the present invention, there is provided a vibration member, provided with an elastic member and an electro-mechanical energy conversion element, for combining a plurality of vibrations formed by applying an alternating signal to the conversion element and generating a driving vibration in the elastic member. In the vibration member, a partial ununiformity of rigidity of the vibration member caused by polarization of the conversion element is offset by partially changing the rigidity of the vibration member, so that a stable driving vibration of the vibration member can be outputted.

Other objects will be apparent by the following detailed description.

BRIEF DESCRIPTION OF THE DRAWINGS

FIG. 1 is a perspective view of a first embodiment of the present invention.

FIGS. 2A and 2B are pattern drawings of a piezoelectric element in the first embodiment of the present invention.

FIG. 17 is a partial development diagram showing a driving principle of the vibration wave motor.

FIGS. 18A and 18B are plan views showing a polarization pattern of the piezoelectric element of the vibration wave motor.

DETAILED DESCRIPTION OF THE PREFERRED EMBODIMENTS:

First Embodiment

FIG. 1 shows a first embodiment of the present invention.

First, the entire constitution of the present embodiment will be described.

In a vibration member of the present embodiment, a plurality of displacement enlarging grooves 4 are formed along a radial direction on a metal elastic member 1 formed in an annular shape for the purpose of enlarging displacement in a peripheral direction caused by flexural vibration.

As shown in FIG. 2A, in an piezoelectric element 2 as an electro-mechanical energy conversion element, a pattern electrode 3 is formed on a surface not bonded to the elastic member 1, and the respective electrodes are arranged at predetermined gaps. The gap prevents the electrodes adjacent to each other from discharging electricity in a polarization process.

For the piezoelectric element 2, polarization is performed between a pattern electrode 3-1 and an electrode 3-2 for covering the entire back surface by applying an electrical potential in a direction shown by symbols (+) and (−) in FIG. 2A.

For the pattern electrode 3-1, respective A and B phase groups shown in FIG. 2A are short-circuited within the groups by a conductive paste, a flexible printed board, or the like, and a flexural moment is applied to excite the elastic member 1 by a force of a direction crossing at right angles to the polarization direction in each electrode area by applying the electrical potential between each phase and the back-surface electrode.

For the polarization direction of the electrode 3-1, as shown in FIG. 2A, the areas adjacent to each other are polarized in opposite directions.

Figure 19:
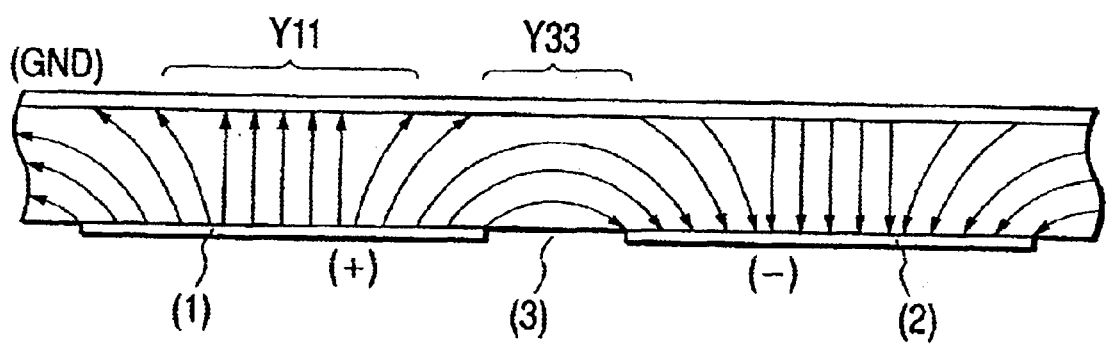
FIG. 19 is a sectional view showing electric force lines during piezoelectric element polarization and a distribution of a modulus of longitudinal elasticity.
Figure 20:
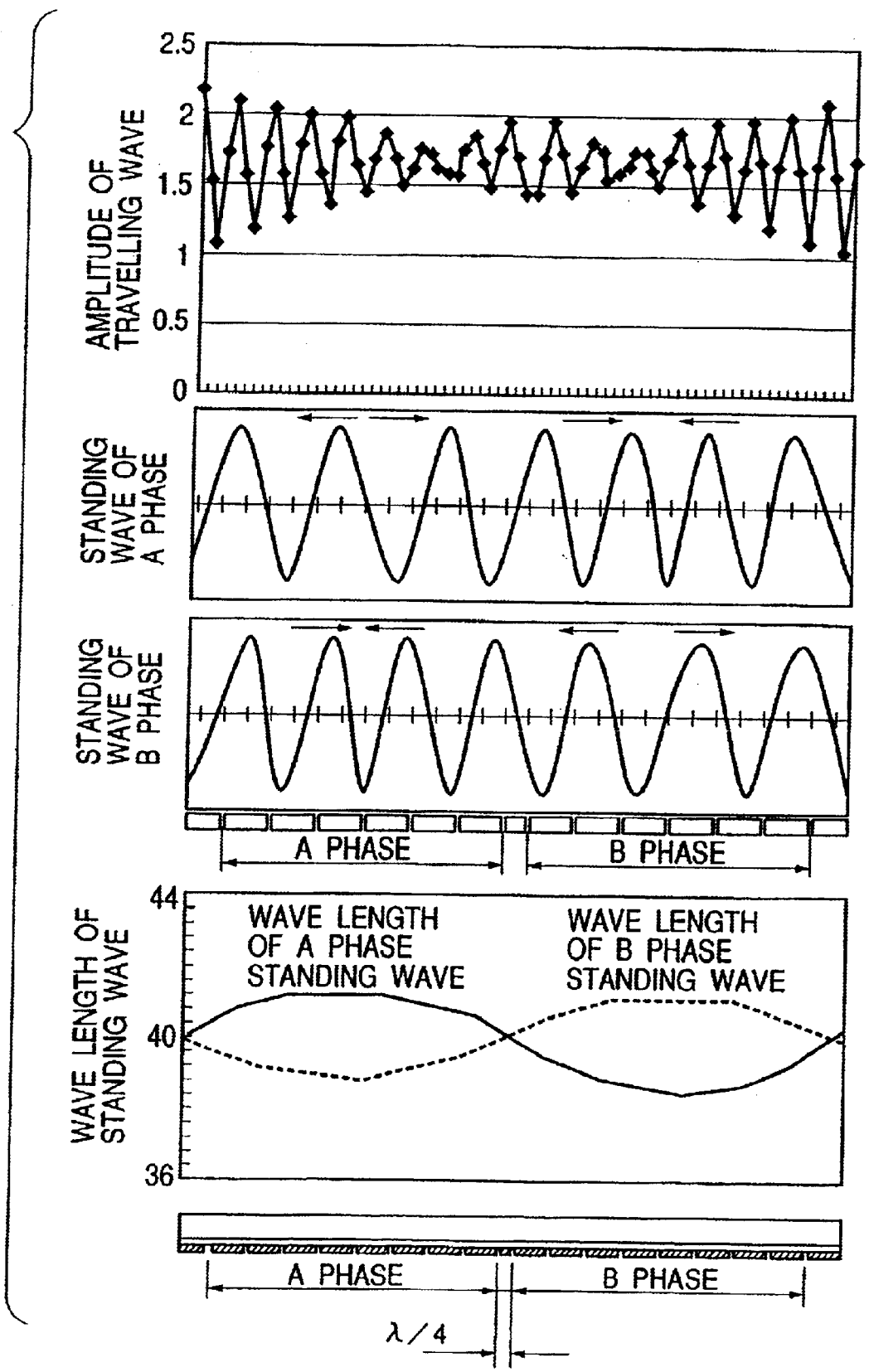
FIG. 20 is an explanatory view of vibration amplitude unevenness of a conventional piezoelectric vibration member.
Figure 21:
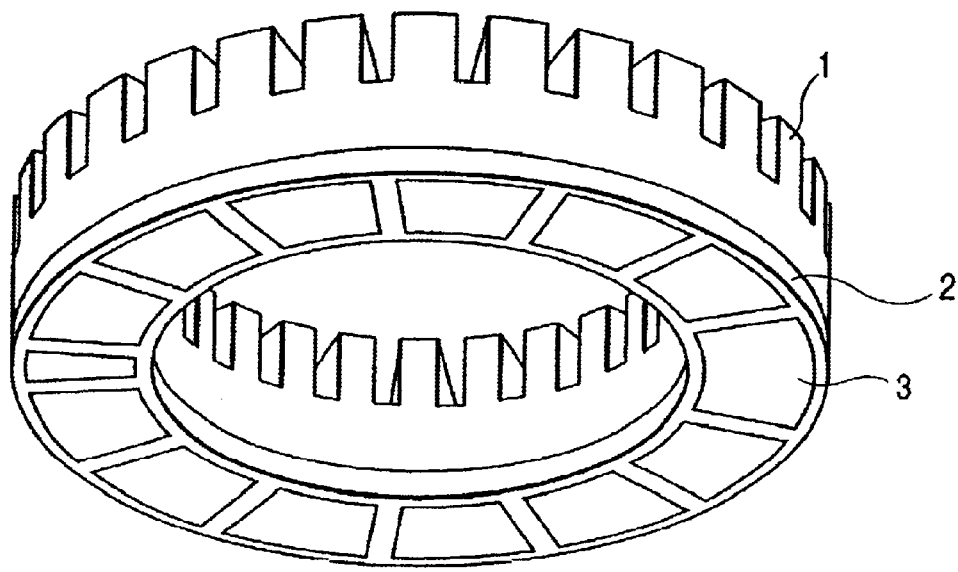
FIG. 21 is a perspective view of the conventional piezoelectric vibration member.
Figure 22:
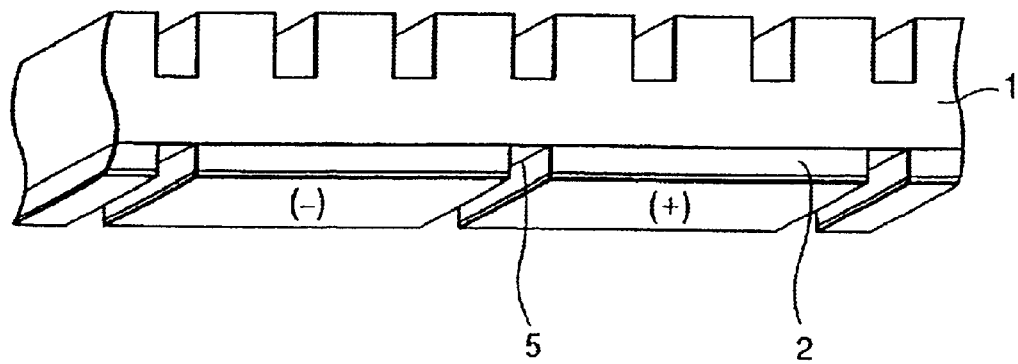
FIG. 22 is a partial development diagram of the conventional piezoelectric vibration member in which the piezoelectric element is divided.
Figure 23:
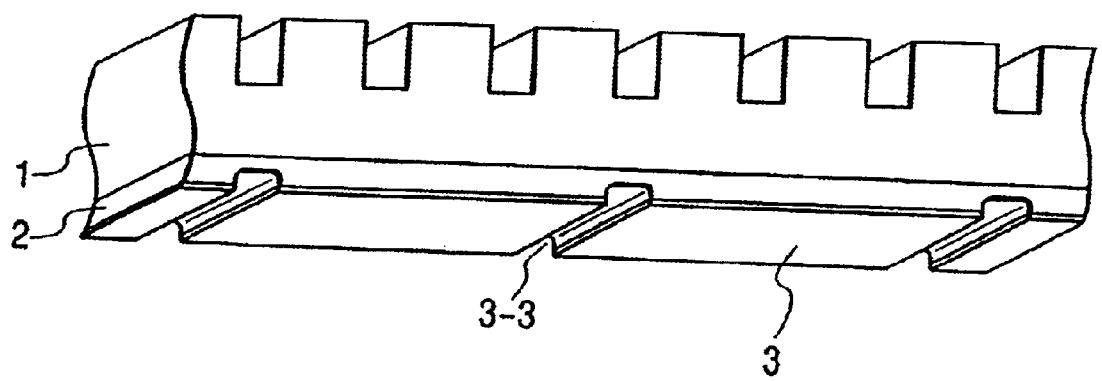
FIG. 23 is a partial development diagram of the conventional piezoelectric vibration member in which an electrode is divided by polishing.

As shown in FIG. 19, since the electrical potential is applied to a spacing 3-3 between adjacent pattern electrodes in a lateral direction during polarization, the polarization is performed in a direction for connecting the adjacent electrodes, and a modulus of longitudinal elasticity in a strain direction of the piezoelectric element is lowered between the electrodes.

In the present embodiment, the displacement enlarging grooves 4 formed in the elastic member 1 are formed at equal intervals (λ/4) along the peripheral direction, an angle of the pattern electrode spacing 3-3 of the piezoelectric element 2 is allowed to agree with the angle of the displacement enlarging groove 4 (the pattern electrode spacing 3-3 is aligned with the displacement enlarging groove 4 in an axial direction), the displacement enlarging groove 4 is also disposed corresponding to the electrode 3-1, and a displacement enlarging groove 4-1 corresponding to the pattern electrode spacing 3-3 is set to be shallow particularly with respect to the depth of the displacement enlarging groove 4 for the electrode 3-1.

In the aforementioned constitution, a sectional secondary moment of a section of the vibration member with a shallow groove can partially be enlarged as compared with the section of the vibration member with another groove portion.

Therefore, when the shallow groove 4 in the elastic member 1 is bonded to and overlapped with a portion of the piezoelectric element 2 with a small modulus of longitudinal elasticity, a rigidity drop of the piezoelectric element 2 is compensated, and a flexural rigidity in an integrated vibration member can be uniformed.

Additionally, in the whole grooves 4, the depth of the groove in the peripheral direction differs (the groove 4-1 adjacent to the groove 4 with a normal depth is shallow), but the depth difference fails to cause a difference in natural frequency of vibration systems of both A and B groups in the vibration member.

A constitution of the present embodiment will next be described in detail.

In the present embodiment, the piezoelectric element 2 is bonded to the metal elastic member 1 by an adhesive, solder or another method. As shown in FIG. 2A, the group of electrodes 3 is formed on a surface which is not bonded to the vibration member of the piezoelectric element 2. The electrode 3 is constituted by forming a conductive material in a film by evaporation, screen printing or the like, and the respective electrodes are arranged at predetermined gaps.

The piezoelectric element 2 is subjected to polarization by applying the electrical potential between the pattern electrode 3-1 and the back-surface electrode 3-2 in the direction shown in FIG. 2A.

The back-surface electrode 3-2 of the piezoelectric element 2 is connected to the vibration member. For the pattern electrode 3-1, the respective A and B phase groups shown in FIG. 2A are short-circuited in the group by the conductive paste, flexible printed board or the like, and the vibration member is provided with flexural moment and excited by a force of a direction crossing at right angles to the polarization direction by applying the electrical potential between each phase and the back-surface electrode (elastic member 1) in the respective electrode areas.

For the polarization direction of the electrode 3-1, as shown by (+), (−) in FIG. 2A, the adjacent areas are polarized in opposite directions.

For the spacing 3-3 between the adjacent electrodes, as shown in FIG. 19, since the electrical potential is applied in the lateral direction during polarization, polarization is performed in the direction for connecting the adjacent electrodes to each other, and the modulus of longitudinal elasticity of the flexural strain direction of the vibration member is low between the electrodes.

The elastic member 1 is provided with a plurality of grooves 4 for the purpose of enlarging the displacement of the peripheral direction caused by flexural vibration.

A minimum unit of arrangement of the pattern electrodes 3-1 of the piezoelectric element 2 is a ¼ wavelength, and in this pattern, a septenary flexural mode is used to excite seven flexural vibrations on one lap. Therefore, in order to allow all the electrode spacings 3-3 to coincide in position with the grooves 4, the number of grooves is an integral multiple of 4×7=28. Here, the groove 4 is equally divided into 28 in the peripheral direction.

The groove 4-1 coinciding in angle with the pattern electrode spacing 3-3 of the piezoelectric element 2 is set to be shallower than the other grooves. Therefore, the drop of the flexural rigidity of the vibration member caused by the drop of the modulus of longitudinal elasticity between the electrodes of the piezoelectric element is corrected by increasing a sectional area of the vibration member and increasing the sectional secondary moment.

Therefore, the propagation speed of the vibration of the standing waves different in phase formed on the vibration member fails to change even in the portion corresponding to the electrode spacing of the piezoelectric element 2, no wavelength unevenness occurs, a waveform of a progressive traveling wave as a driving wave obtained by combining two-phase standing waves is stabilized, driving efficiency is enhanced, and deviation friction can be prevented from occurring.

Second Embodiment

Figure 3:
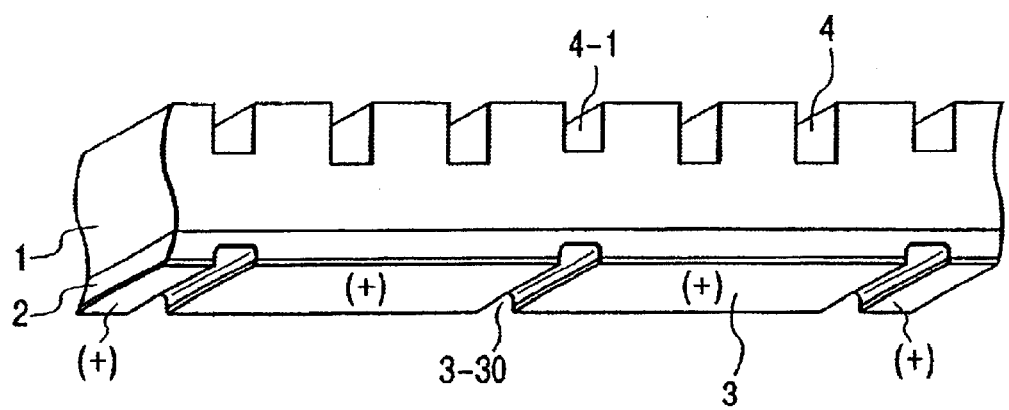
FIG. 3 is a partial development diagram of a piezoelectric vibration member of a second embodiment of the present invention.

FIG. 3 is a partial development diagram of a second embodiment of the present invention.

In the present embodiment, the pattern electrode 3 of the piezoelectric element 2 is disposed on the entire surface during polarization, and polarization is performed in the same thickness direction in all areas. After the polarization, the electrode is polished with a grindstone, a metal saw or the like and divided into a plurality of electrode groups.

Since the rigidity of a portion 3-30 removed to divide the electrode (hereinafter referred to as the electrode dividing portion) is lowered, in the present embodiment, the electrode dividing portion is disposed corresponding to the groove 4 of the vibration member, and the groove 4-1 corresponds to the electrode dividing portion 3-30 in the axial direction (thickness direction of the piezoelectric element) is reduced in depth and enlarged in sectional area, so that a partial rigidity difference by partial shape ununiformity of the piezoelectric element 2 is corrected, and the modulus of longitudinal elasticity of the vibration member constituted of the elastic member 1 and piezoelectric element 2 is set to be uniform in the peripheral direction.

Modification of Second Embodiment

Figure 4:
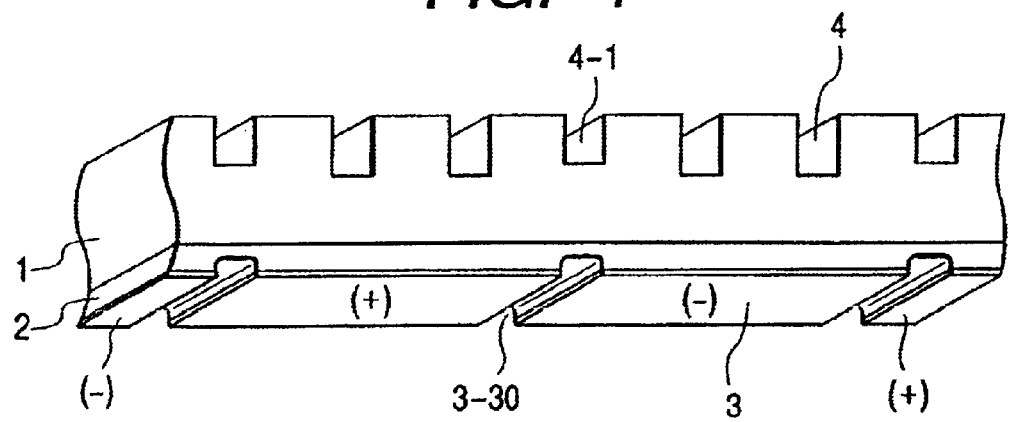
FIG. 4 is a partial development diagram of the piezoelectric vibration member of the second embodiment of the present invention.

FIG. 4 shows a modification example of the second embodiment.

In the second embodiment, the piezoelectric element 2 is subjected to a polarization treatment in the same direction, and subsequently the individual electrodes are divided and formed by a cutting treatment. However, as shown in FIG. 4, after the electrode is divided beforehand, the polarization treatment may be performed to obtain a polarization pattern similar to that of the first embodiment.

Third Embodiment

Figure 5:
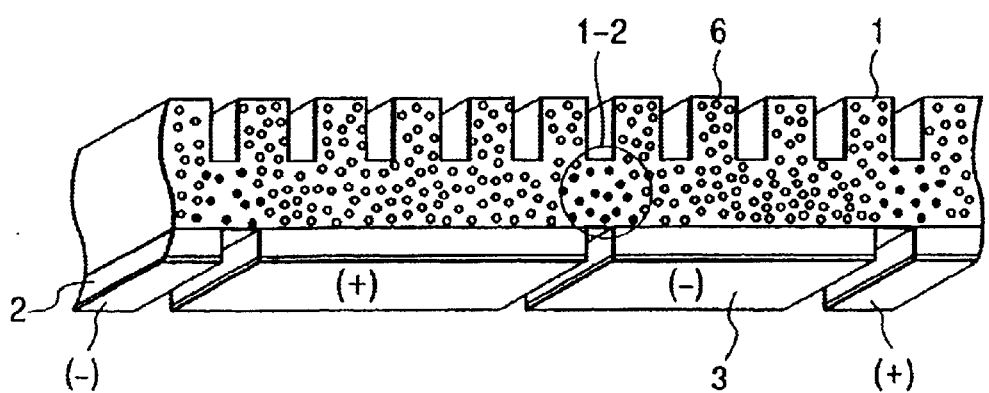
FIG. 5 is a partial development diagram of the piezoelectric vibration member of a third embodiment of the present invention.

FIG. 5 is a partial development diagram of a third embodiment of the present invention.

In the present embodiment, as the piezoelectric element 2, a plurality of divided elements are used. The respective piezoelectric elements 2 are polarized in a single direction within the area, and arranging and bonding are performed by changing bonding directions to the vibration member on front and back surfaces, so that pattern arrangements different in the polarization direction are realized.

In this constitution, since the piezoelectric element in the form of a finely divided chip can be used, even with a large total area of the piezoelectric element, manufacture can be performed inexpensively. However, since there is no element in the boundary between the elements, rigidity is disadvantageously deteriorated as compared with a portion in which the piezoelectric element 2 is present.

The elastic member 1 is formed by a powder sintering method or the like, and includes a multiplicity of pores 6. By impregnating the pore in the vicinity of the boundary 3-3 between the elements 3 with a material whose melting point is lower than that of the material of the elastic member 1 to form an area 1-2 (shown by a black circle in FIG. 5), a composition is changed, a modulus of elasticity is increased, a rigidity drop by the absence of the piezoelectric element in the boundary 3-3 is compensated, and a uniform rigidity is realized.

In the present embodiment, since correction is performed in the vicinity of the piezoelectric element portion, a vibration member neutral axis changes only little, and not only amplitude unevenness of a vibration direction but also amplitude unevenness of a propagation direction can precisely be corrected.

In the present embodiment, in order to perform the correction with the shape of the bonded surface of the vibration member, a groove pitch may have no relation to the arrangement of the piezoelectric elements.

Fourth Embodiment

Figure 6:
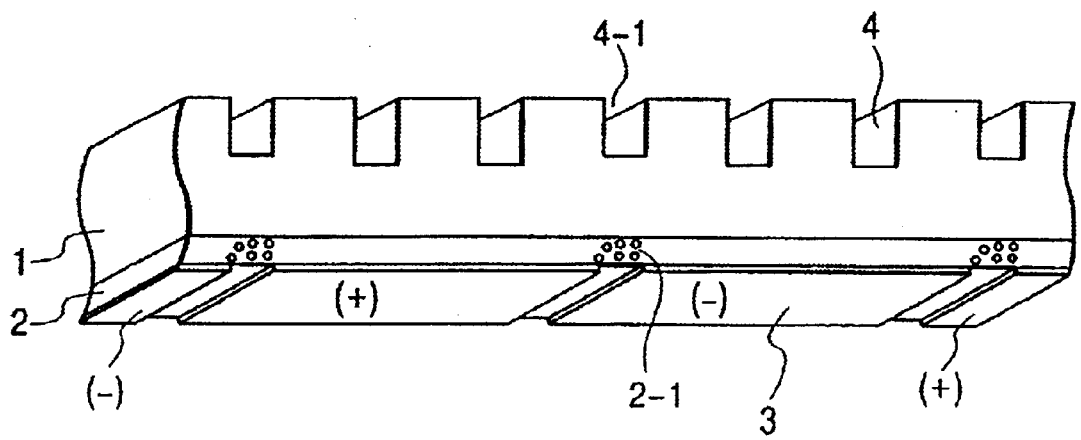
FIG. 6 is a partial development diagram of the piezoelectric vibration member of a fourth embodiment of the present invention.

FIG. 6 is a partial development diagram of a fourth embodiment of the present invention.

In a piezoelectric member constituting the piezoelectric element 2, since a large electrical potential difference is produced in a boundary 2-1 of adjacent electrode areas different in polarization direction during polarization, the piezoelectric element causes a grain field destruction (shown by a white circle in FIG. 6). Since the modulus of elasticity is lowered in this area, similarly as the first embodiment, the groove 4-1 of the elastic member 1 corresponding to the boundary 2-1 is set to be shallow, the sectional secondary moment is increased, the rigidity different partially generated in the piezoelectric element 2 is corrected by the elastic member 1, and the modulus of longitudinal elasticity of the vibration member constituted of the elastic member 1 and piezoelectric element 2 is uniform in the peripheral direction.

Fifth Embodiment

Figure 7:
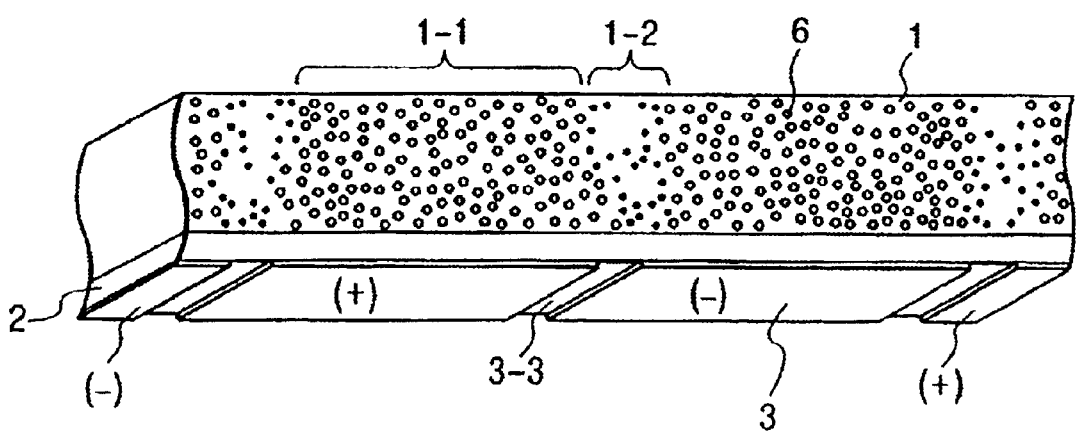
FIG. 7 is a partial development diagram of the piezoelectric vibration member of a fifth embodiment of the present invention.

FIG. 7 is a partial development diagram of a fifth embodiment of the present invention.

The elastic member 1 of the present embodiment is formed by the powder sintering method or the like, and includes a multiplicity of pores 6. By forming an area 1-2 in which a small number of pores are present in an area with a low modulus of longitudinal elasticity, the composition is changed, the modulus of elasticity is increased, the partial rigidity drop of the piezoelectric element 2 is corrected by the elastic member 1, and the modulus of longitudinal elasticity of the vibration member constituted of the elastic member 1 and piezoelectric element 2 is uniform in the peripheral direction.

A method of reducing the pores 6 is realized by compressing only a portion corresponding to the boundary 1-2 of the piezoelectric element 2 with a high pressure, crushing the pores, and subsequently finishing the member by a mechanical processing.

Sixth Embodiment

Figure 8:
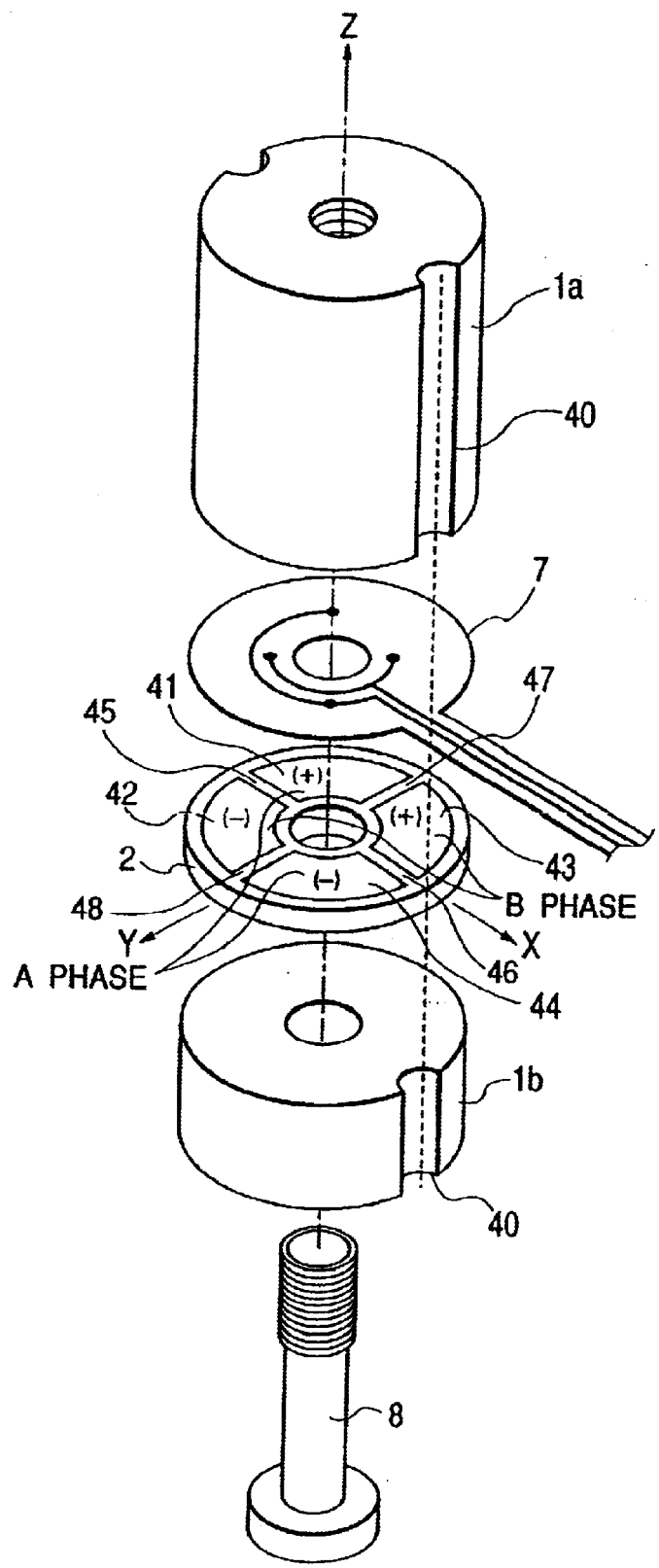
FIG. 8 is an exploded perspective view of the piezoelectric vibration member of a sixth embodiment of the present invention.
Figure 9:
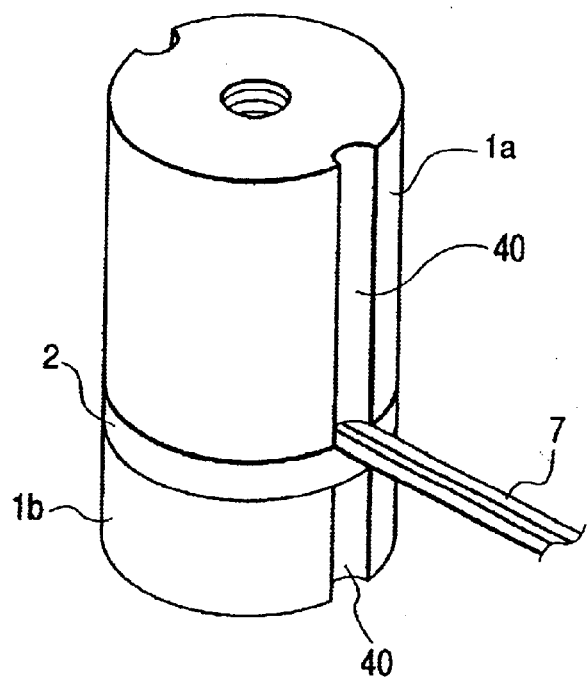
FIG. 9 is a perspective view of the piezoelectric vibration member of the sixth embodiment of the present invention.

FIG. 8 is an exploded view of the vibration member of a sixth embodiment of the present invention, and FIG. 9 is a diagram showing an assembled state of FIG. 8.

The vibration member of the present embodiment is a so-called bar-shaped vibration member formed by placing the piezoelectric element 2 and a voltage applying flexible printed board 7 between a first elastic member 1a and a second elastic member 1b, and holding these components via a bolt 8, and the piezoelectric element 2 is subjected to the polarization treatment in the thickness direction as shown by symbols (+), (−) in FIG. 8.

In the vibration member, a flexural primary vibration mode is excited by using two sets of (+), (−) electrodes disposed opposite to each other via a center hole as two A, B phases, and applying alternating-current voltages with a time phase difference of 90 degrees, and an oscillating movement is performed by combining two vibrations deviating from each other by 90 degrees.

The piezoelectric element 2 of the present embodiment utilizes displacement of a direction parallel to the polarization direction of the thickness direction, that is, of the thickness direction, and the modulus of longitudinal elasticity of the axial direction (Z direction) as the thickness direction of the piezoelectric element, that is, the modulus of longitudinal elasticity (referred to as Y33) of the polarization direction largely contributes to the flexural rigidity of the vibration member.

However, between the electrodes different in the polarization direction and adjacent to each other, an electrical potential difference is made in the plane during polarization, the polarization is therefore performed in the lateral direction, and in this case the modulus of longitudinal elasticity of the axial direction indicates the modulus of longitudinal elasticity (referred to as Y11) of the direction crossing at right angles to the polarization direction.

As described above, since there is a relation of Y11>Y33 between two moduli of longitudinal elasticity, for the flexural rigidity of the vibration member, the flexural rigidity around Y axis becomes large as compared with flexure around X axis of FIG. 8.

Specifically, with the flexure around the X axis, since the polarization treatment direction of electrodes 41 and 42 is different in polarity from that of electrodes 43 and 44, a boundary 45 between the electrodes 41 and 42 and a boundary 46 between the electrodes 43 and 44 are subjected to the polarization of the lateral direction, and the modulus of longitudinal elasticity is Y11. Moreover, with the flexure around the Y axis, a boundary 47 between the electrodes 41 and 43 and a boundary 48 between the electrodes 42 and 44 are subjected to the polarization of Z-axis direction, and the modulus of longitudinal elasticity is Y33.

Figure 10:
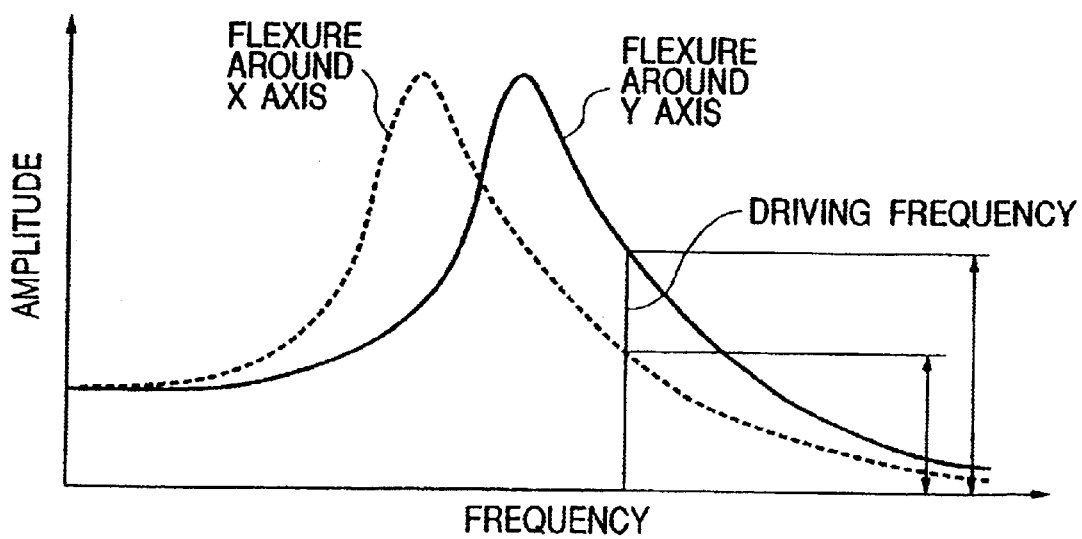
FIG. 10 shows a frequency response of the piezoelectric vibration member of the sixth embodiment of the present invention in a conventional shape.

Flexural vibrations excited by the respective A, B electrode portions can be represented by a combination of flexural vibrations around the X, Y axes. As shown in FIG. 10, for frequency properties of the flexural vibrations around the X and Y axes, since the vibration around the Y axis with a high rigidity shifts toward a high frequency side. Therefore, when excitation is performed with a frequency higher than that of a resonance point, for the flexural vibrations by respective A, B inputs, a flexural amplitude component around the Y axis increases for both A and B. As a result, respective positions of flexural vibration of A, B deviate in an X axis direction, and a position phase difference of A and B deviates from a predetermined angle of 90°.

Therefore, the oscillating movement by the combined vibration is elliptical in which the flexure around the Y axis is large.

To solve the problem, in the present embodiment, for both the first and second vibration members, a groove 40 is formed along the axial direction in order to lower the flexural rigidity around the Y axis, and the flexural rigidities around the respective axes are adjusted.

Figure 11:
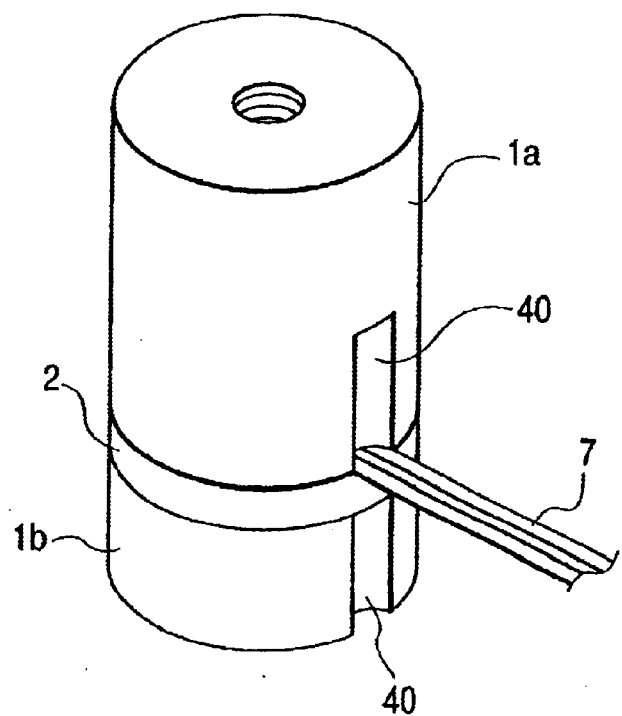
FIG. 11 is a partial development diagram of the piezoelectric vibration member of the sixth embodiment of the present invention.

In addition to the groove processing described above, a correction method to the elastic member can further be realized by countersinking or by chamfering a ridge formed by a piezoelectric element holding surface and an outer peripheral surface. When the correction is performed with a portion apart from the piezoelectric element, a vibration member equivalent mass is changed. Therefore, the groove may be processed only in the vicinity of the piezoelectric element 2 as shown in FIG. 11. By forming the elastic member by a sintered powder material having a multiplicity of pores or the like, and raising a density in the vicinity of the boundaries 45 and 46 by a press molding shown in FIG. 27 as described later to increase the flexural rigidity around the X-axis, or impregnating the member with another metal material, the rigidity ununiformity can be corrected.

Seventh Embodiment

Figure 12:
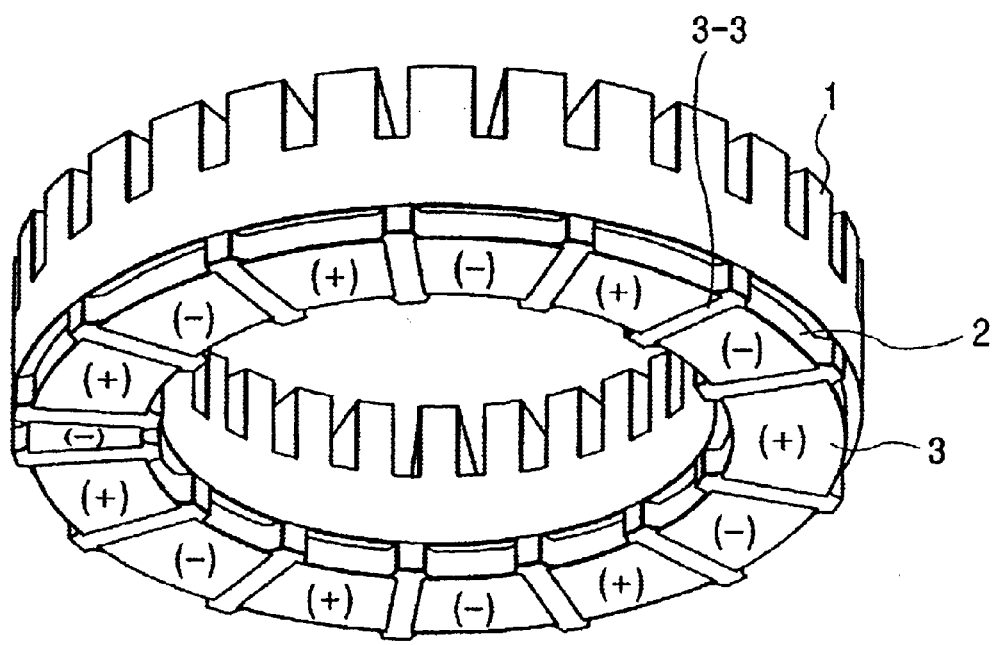
FIG. 12 is a perspective view of the piezoelectric vibration member of a seventh embodiment of the present invention.

FIG. 12 shows a seventh embodiment of the present invention.

In the vibration member of the present embodiment, the electrodes adjacent to each other in the annular piezoelectric element 2 bonded to the annular elastic member 1 are polarized in reverse directions in the thickness direction as shown by symbols (+), (−) in FIG. 12.

The vibration member of the present embodiment utilizes displacement of a direction (peripheral direction) crossing at right angles to the polarization direction of the piezoelectric element to excite the flexural vibration, and the modulus of longitudinal elasticity of the peripheral direction of the piezoelectric element contributes to the flexural rigidity of the vibration member. In the electrode spacing 3-3, as an area between the adjacent electrodes, polarized in the peripheral direction, the modulus of longitudinal elasticity of the peripheral direction is lowered by an influence of a polarization treatment direction as described above. Therefore, in the present embodiment, by enlarging the width of the electrode spacing 3-3 and enlarging the sectional area, the rigidity of the portion with a lowered modulus of elasticity is uniformed.

As described above, since the distribution of the modulus of longitudinal elasticity of the piezoelectric element is uniformed by the piezoelectric element shape, positioning with the elastic member to be bonded is unnecessary, which provides an advantage that an error by deviation during bonding is not easily generated.

Eighth Embodiment

Figure 13:
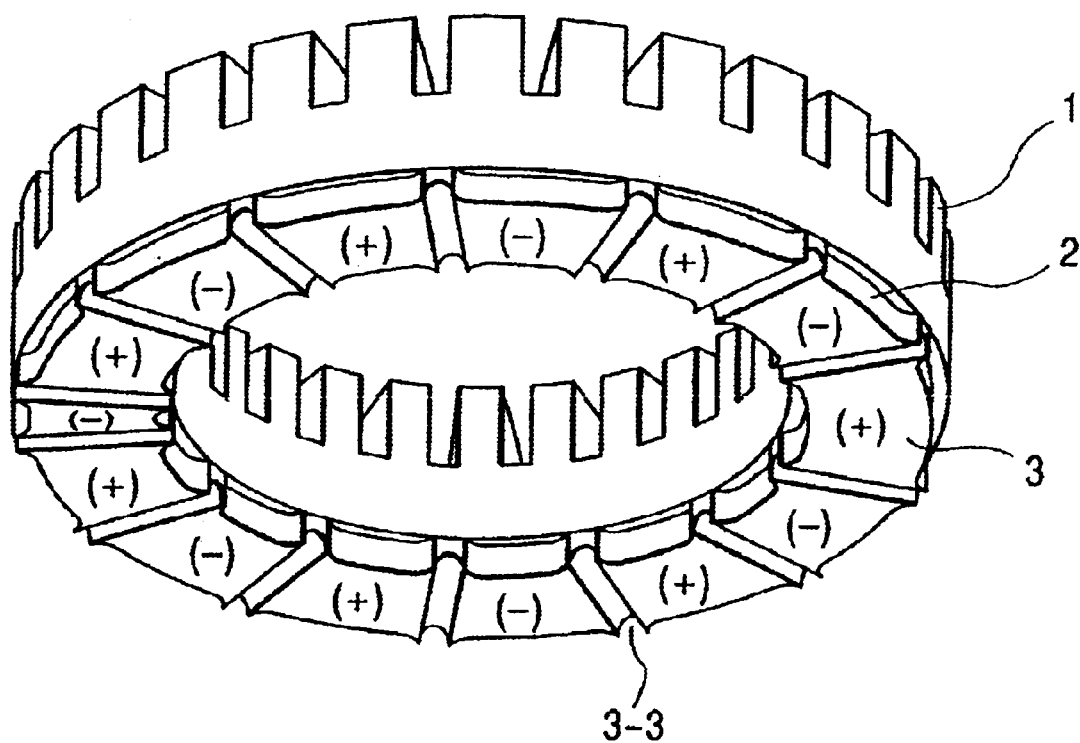
FIG. 13 is a perspective view of the piezoelectric vibration member of an eighth embodiment of the present invention.

FIG. 13 shows an eighth embodiment of the present invention.

The vibration member of the present embodiment is constituted by bonding the annular piezoelectric element 2 to the annular elastic member 1. For the piezoelectric element 2, by entirely forming an electrode film on both the surface to be bonded to the elastic member 1 and the pattern electrode surface on which the pattern electrode 3 is to be formed, subsequently performing the polarization treatment, and polishing the electrode with the grindstone, metal saw or the like to separate the electrode, a shown electrode pattern is obtained.

For the portion 3-3 from which the electrode is separated, since thickness is reduced, rigidity is deteriorated. In the present embodiment, by broadening the portion in which the thickness decreases and the rigidity is deteriorated, a substantially uniform sectional area is obtained. This can realize the uniform flexural rigidity of the vibration member and reduce the vibration amplitude unevenness.

Ninth Embodiment

Figure 14:
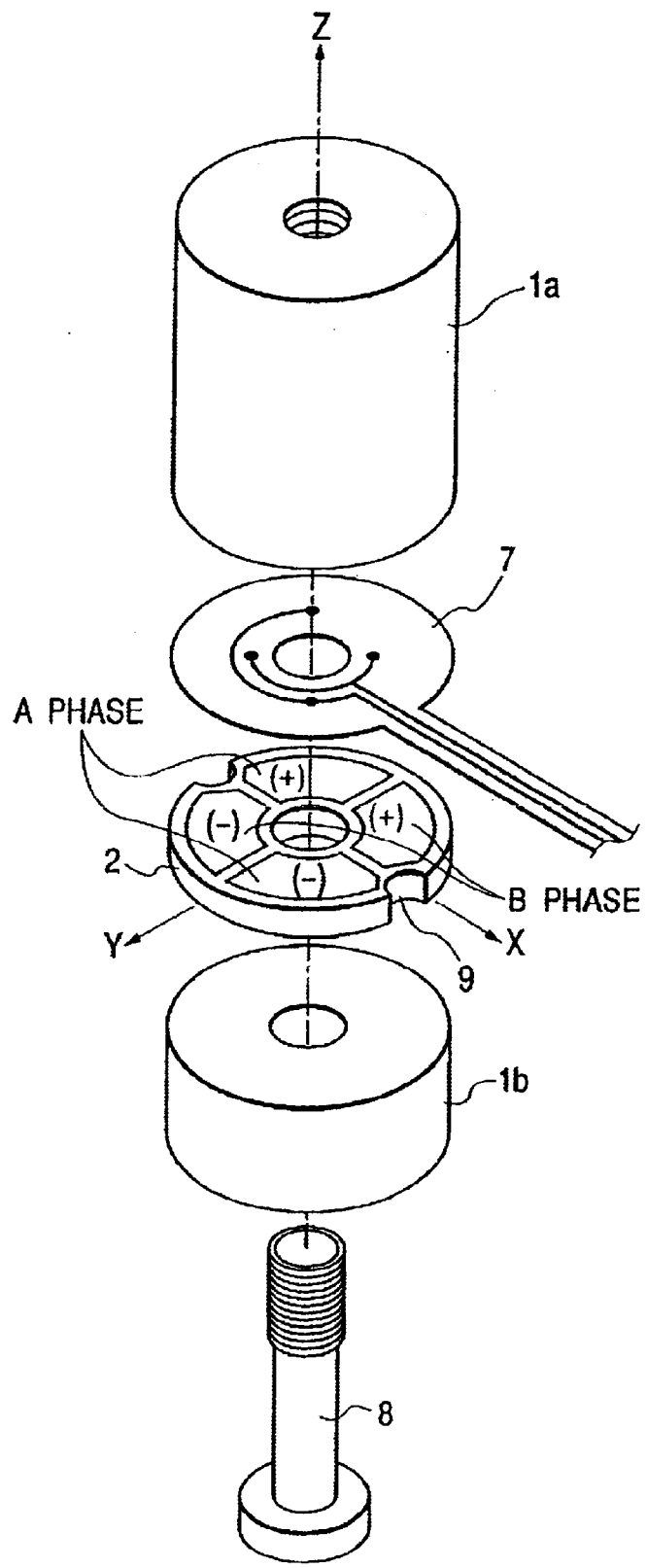
FIG. 14 is an exploded perspective view of the piezoelectric vibration member of a ninth embodiment of the present invention.

FIG. 14 shows a ninth embodiment of the present invention.

The constitution and function of the vibration member in the present embodiment are similar to those shown in the sixth embodiment.

In the present embodiment, by disposing a cutout 9 in the vicinity of the boundary of the area in which the adjacent electrodes of the piezoelectric element 2 are polarized in the reverse directions, the flexural rigidity around the Y axis of the piezoelectric element is lowered and adapted to the flexural rigidity around the X axis. In the sixth embodiment, it is necessary to adjust the angle and tighten the components so that the piezoelectric element 2 is aligned with the respective grooves 40 of two elastic members 1*a* and 1*b*. In the present embodiment, however, since the correction is already performed only with the piezoelectric element, the correction can advantageously be performed without performing the positioning.

Tenth Embodiment

Figure 15:
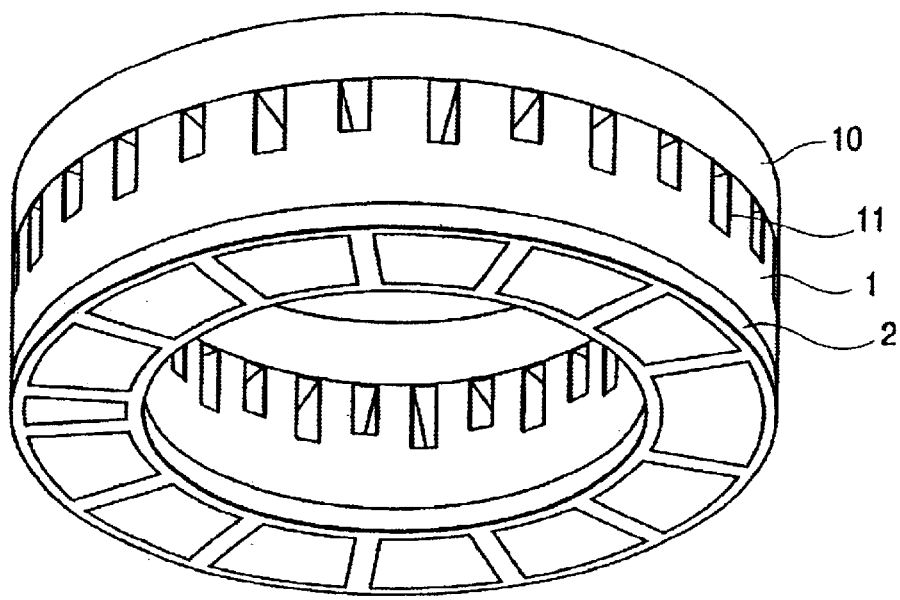
FIG. 15 is a perspective view of a vibration wave motor of a tenth embodiment of the present invention.

FIG. 15 shows a tenth embodiment of the present invention.

There is provided a vibration wave motor in which a moving member 10 formed of elastic materials such as a metal is pressed onto the elastic member 1 of the first embodiment via a viscous fluid layer 11 constituted of viscous fluids such as oil and grease, and the moving member 10 is driven by a transmission force of an oil film under a high pressure.

The transmission force largely changes with a film thickness in the driving via the viscous fluid. Therefore, when there is an unevenness of a traveling wave amplitude as in a conventional vibration wave motor, the film thickness increases in a place with a large amplitude. Since the film is thickened in a place with a small amplitude, it is difficult to obtain the film thickness for efficiently transmitting the force. On the other hand, in the present embodiment, since the amplitude unevenness is reduced as described above, a uniform film thickness distribution can be obtained, and driving can efficiently be performed.

Eleventh Embodiment

Figure 16:
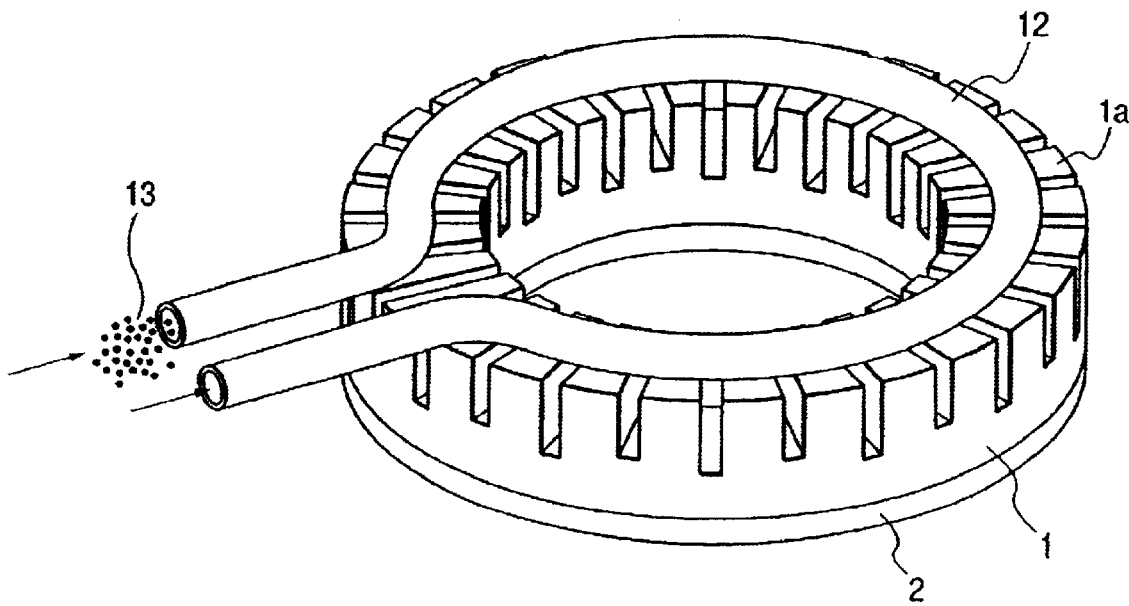
FIG. 16 is a perspective view of a powder material conveying apparatus of an eleventh embodiment of the present invention.

FIG. 16 shows a powder material conveying apparatus of an eleventh embodiment of the present invention.

In the present embodiment, the vibration member of the first embodiment constituted of the elastic member 1 and piezoelectric element 2 is used, and the traveling wave amplitude unevenness is reduced by changing the depth of the groove 4 of the elastic member 1.

Along the peripheral direction on protrusions formed by the grooves 4 on the driven surface of the elastic member 1, an annular portion formed by a part of a tube 12 of soft materials such as resin is laid and fixed by an adhesive, or the like.

A power material 13 placed in the tube 12 is conveyed in the annular tube by the elliptical movement of the traveling wave excited in the vibration member. In the conveying apparatus, the powder material in the tube 12 can continuously be conveyed. Furthermore, with an easily coalescent powder material, even when the material condenses and solidifies, the material is crushed by vibration and can be supplied in an original particulate state.

When the annular moving member is driven like the usual vibration wave motor, the total of driving forces in respective driving positions corresponds to the driving force of the moving member. Therefore, by removing the unevenness in a pressurizing force, flatness, rigidity, and the like of the moving member, the driving force is averaged.

However, with micro materials such as the powder material of the present embodiment, the force is not averaged, the speed differs with the position, and clogging or another problem occurs in a place with a small driving force.

However, in the present embodiment, by correcting a rigidity difference attributed to the piezoelectric element, the traveling wave amplitude can be uniform, and the aforementioned problem can effectively be reduced.

Twelfth Embodiment

Figure 24:
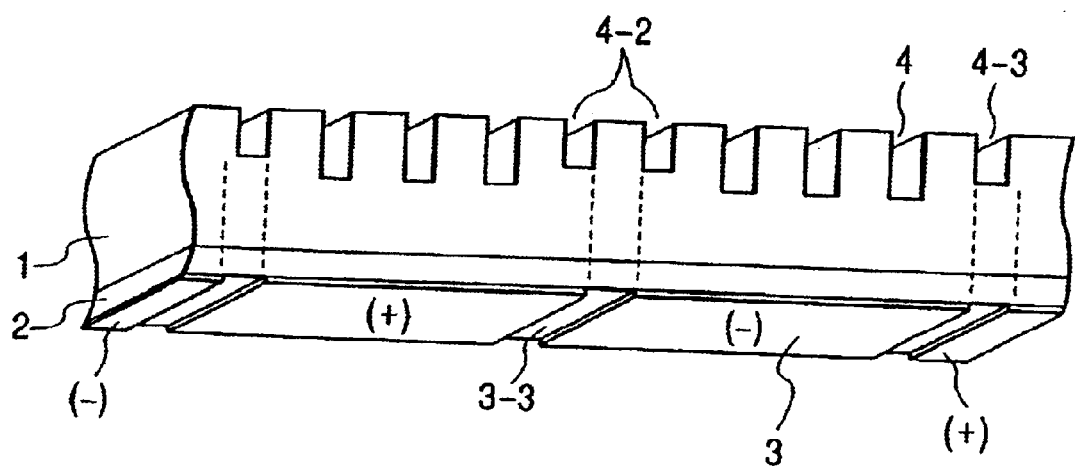
FIG. 24 is a perspective view showing a twelfth embodiment of the present invention.

FIG. 24 is a partial development diagram of a twelfth embodiment of the present invention.

In the first embodiment, the spacing between the adjacent electrodes of the piezoelectric element 2 coincides in position with the groove, but in the vibration member of the present embodiment, the electrodes spacing does not necessarily coincide in position with the groove.

In the present embodiment, when the groove 4 is not disposed corresponding to the position of the spacing 3-3 between the electrodes with a deteriorated rigidity, the rigidity difference is corrected by setting a groove 4-3 closest to the position to be shallow, or the rigidity difference in the vicinity of the electrode spacing is corrected by arranging a plurality of shallow grooves 4-2 to dispose the electrode spacing 3-3 therebetween.

In order to correct the rigidity difference, the groove may not coincide in position with the electrode spacing, and a rigidity difference may be made in a plurality of grooves so that the rigidity against flexural displacement of the vibration member becomes uniform.

Thirteenth Embodiment

Figure 25:
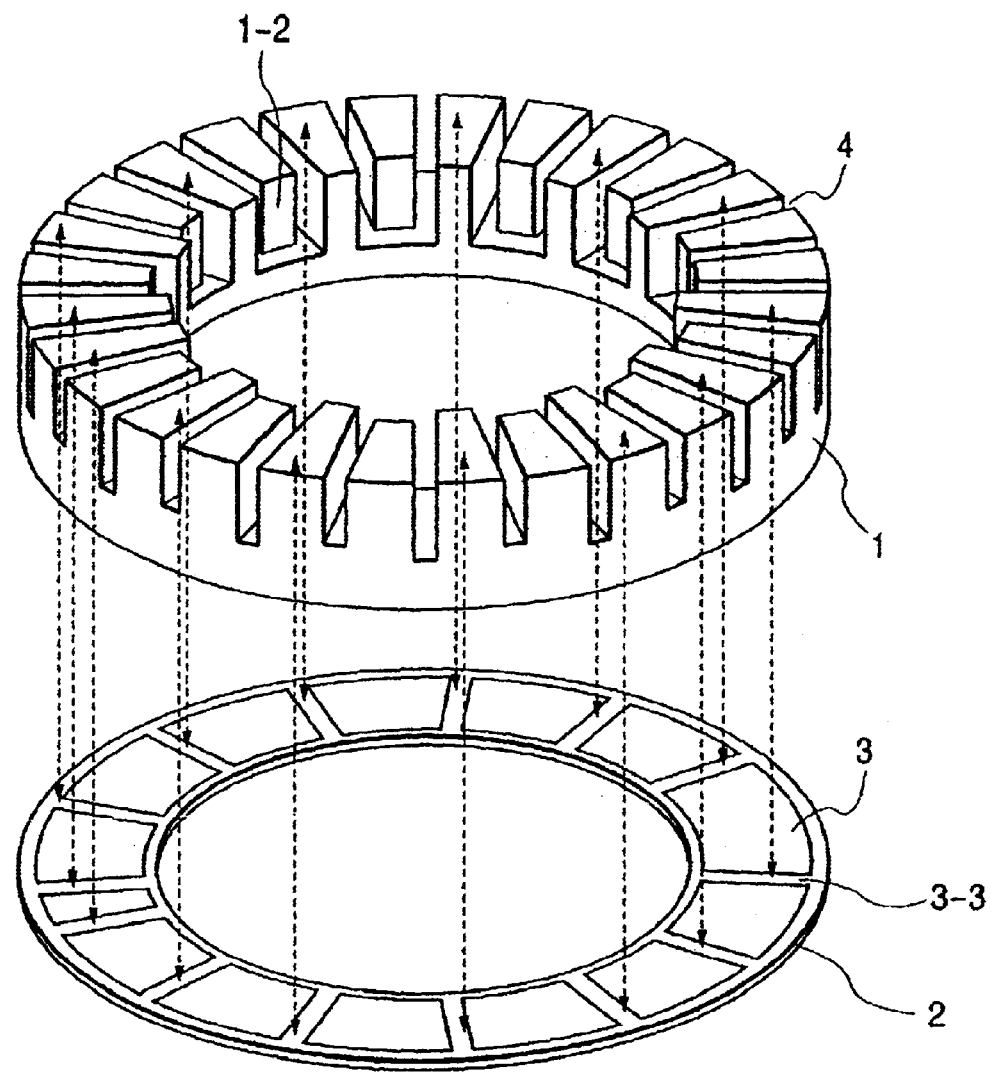
FIG. 25 is an exploded perspective view showing a thirteenth embodiment of the present invention.

FIG. 25 is an exploded perspective view of a thirteenth embodiment of the present invention.

In the present embodiment, the vibration member is constituted by bonding the elastic member 1 to the piezoelectric element 2 with a relative angle as shown in FIG. 25 by an adhesive or the like.

In the present embodiment, the spacing 3-3 between the adjacent electrodes polarized in directions different from each other in the piezoelectric element 2 does not coincide in position with the groove 4 of the vibration member, and an inner diameter side 1-2 of a protrusion which fails to coincide with the electrode spacing 3-3 is removed so that the rigidity of the position of the elastic member 1 substantially coinciding with the electrode spacing 3-3 is large as compared with other areas.

Fourteenth Embodiment

Figure 26:
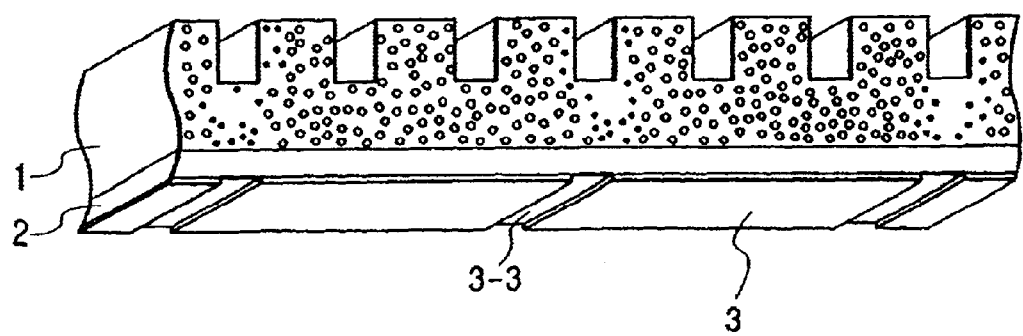
FIG. 26 is a perspective view showing a fourteenth embodiment of the present invention.
Figure 27:
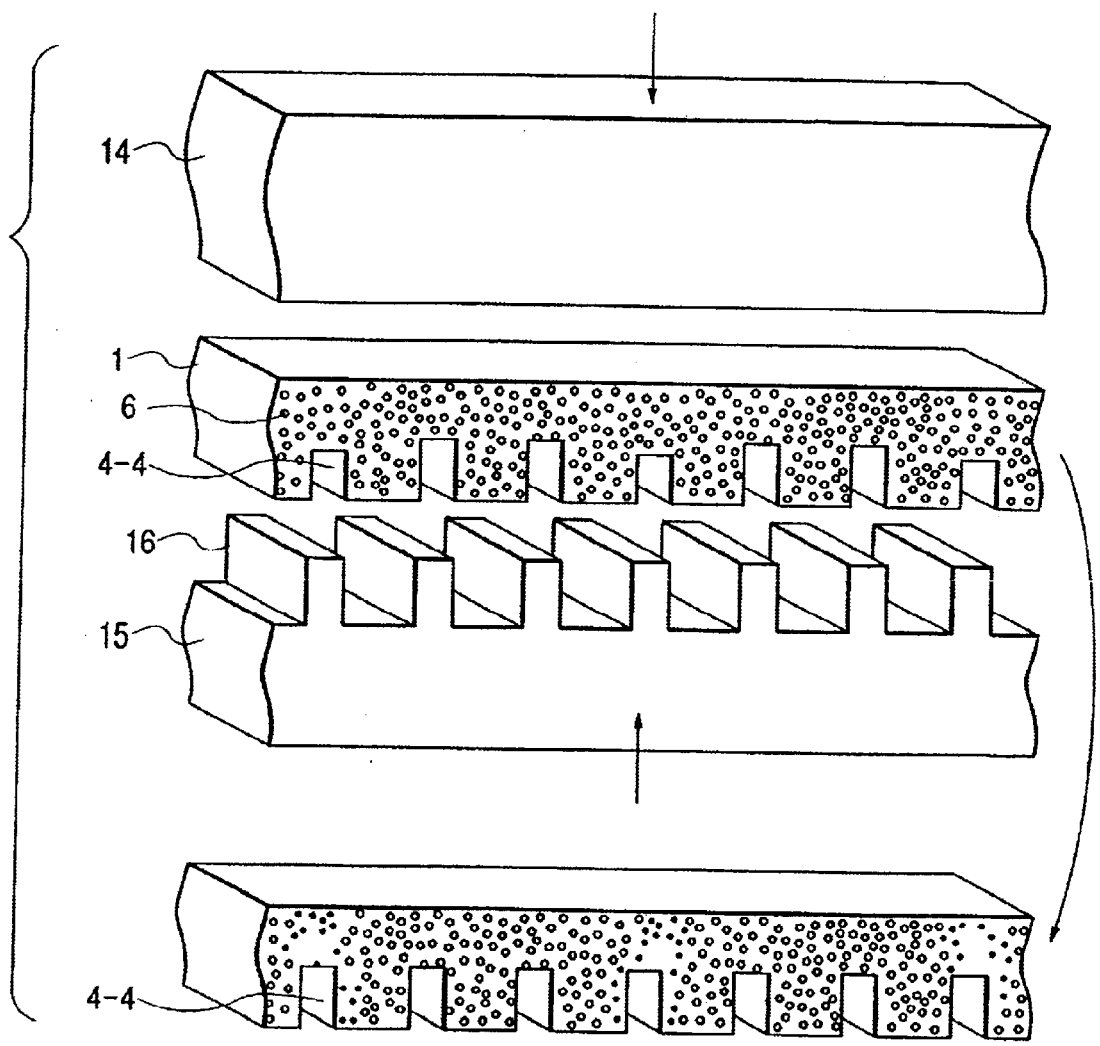
FIG. 27 is a perspective view showing a method of manufacturing an elastic member of FIG. 26.

FIG. 26 is a partial development diagram of the vibration member of a fourteenth embodiment of the present invention, and FIG. 27 is a perspective view showing a process for providing the vibration member of FIG. 26 with the rigidity difference.

The elastic member 1 is formed of a material including a multiplicity or pores 6 by the powder sintering method or the like.

Since a powder compact obtained by compacting a metal powder is sintered at a high temperature equal to or less than a metal melting point to obtain a sintered material, warp or strain is generated in a sintering process, precision is deteriorated, and the material is not suitable as it is for use as the elastic member.

Therefore, in the present embodiment, by placing a mold 14 on the bottom of a plurality of grooves 4 of the elastic member 1 and placing a mold 15 on the bonded surface of the piezoelectric element 2 to hold and press the material, the shape is straightened.

Since a groove 4-4 of the sintered member substantially corresponding in position to the spacing 3-3 between the adjacent electrodes polarized in the directions different from each other during bonding of the piezoelectric element 2 is set beforehand to be thicker than other grooves, and protrusions 16 of the mold for pressing the groove bottom are set beforehand to the same height, by pressing this constitution to straighten the shape, the pores of the groove 4-4 are crushed more strongly than the other portions to raise density. By increasing the modulus of elasticity in this manner, the rigidity ununiformity can be corrected.

For the material provided with a multiplicity of pores, internal loss increases during vibration, and efficiency is deteriorated for an actuator. Therefore, a material whose elasticity constant is smaller than that of the sintered metal constituting the elastic member may be molten to impregnate or fill the remaining pores.

In the present embodiment, since the rigidity can be modified without changing the shape of a finished product, the neutral surface of flexural displacement changes little. Furthermore, by performing a pressing process for enhancing a size precision also as a process for correcting the rigidity difference, further inexpensive manufacture is possible.

Fifteenth Embodiment

Figure 28:
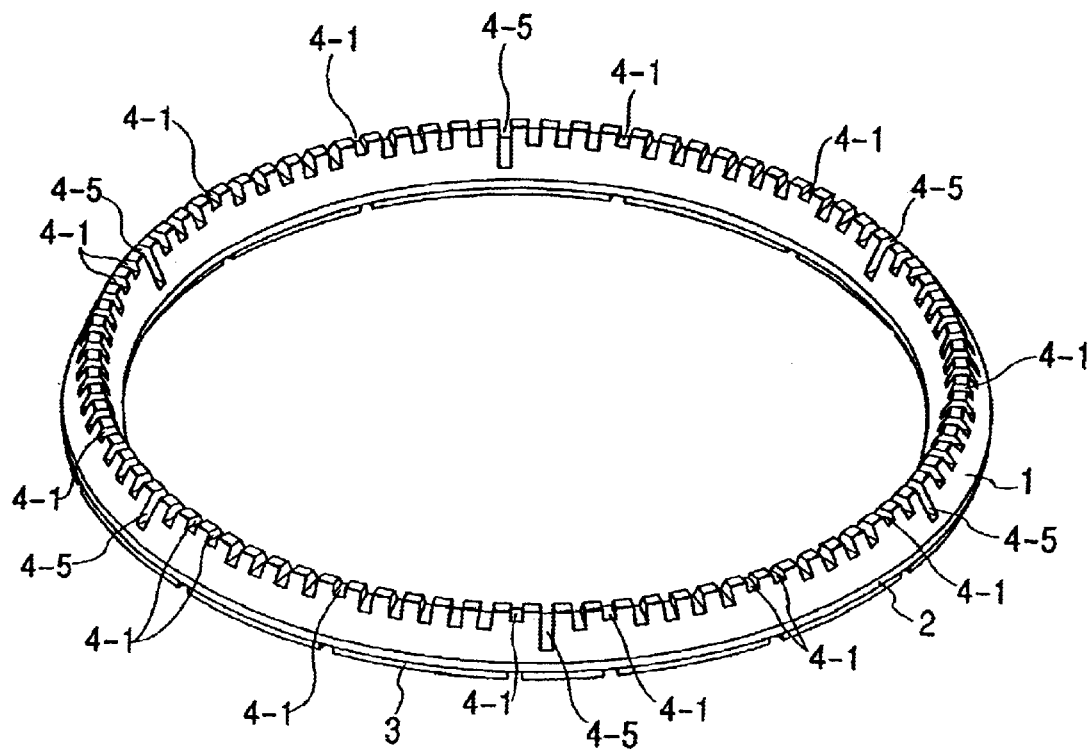
FIG. 28 is a perspective view showing a fifteenth embodiment.

FIG. 28 is a perspective view of a fifteenth embodiment of the present invention.

In the present embodiment, to remove an unnecessary progressive vibration generated in the vibration wave motor, the elastic member 1 is provided with a rigidity ununiformity portion 4-5 whose groove is deeper than the other grooves. For the unnecessary progressive vibration wave generated in the vibration wave motor, in a degree different from that of the traveling wave, for use in driving, obtained by combining a plurality of standing waves formed by the piezoelectric element for driving, when the traveling wave is formed in an audible range by various factors such as an influence on the vibration wave motor from the outside or an internal defect, the wave is heard as a squeak.

Therefore, to inhibit the traveling wave from occurring in the degree in which this squeak is generated, natural frequencies of two modes forming the traveling wave in the degree in which the squeak is generated are provided with a sufficient difference. Moreover, in order to prevent these two mode vibrations from being simultaneously excited, the vibration member is provided with the rigidity ununiformity portions 4-5 by a division number corresponding to the flexural vibration degree of the unnecessary vibration.

The piezoelectric element 2 is provided with the electrode 3, and adjacent electrode areas are polarized in directions reverse to each other, and in the thickness direction. For a portion of the elastic member 1 corresponding to the spacing between the adjacent electrodes polarized in the different directions, by forming the groove 4-1 to be shallow, raising the flexural rigidity, and offsetting the low rigidity portion between the electrodes of the piezoelectric element 2, the unevenness of the traveling wave amplitude generated by the low rigidity portion between the electrodes of the piezoelectric element 2 is reduced.

The deep groove 4-5 for removing the unnecessary vibration and the groove 4-1 for correcting the rigidity difference are arranged not to coincide with each other. However, when the same groove is used as the deep groove 4-5 for removing the unnecessary vibration and the groove 4-1 for correcting the rigidity difference, by providing the groove with a rigidity change of a sum of a rigidity drop for removing the unnecessary vibration and a rigidity increase for correcting the rigidity difference, the same effect is obtained.

Additionally, even in the bar-shaped vibration member shown in FIGS. 8, 9 of the sixth embodiment, in addition to the groove for correcting the rigidity difference, by disposing the unnecessary vibration removing groove, cutout, chamfer, and the like, the similar effect is obtained. When two grooves coincide with each other, the rigidity change of the sum may be applied.

As in the present embodiment, even when the vibration member is provided with the rigidity difference for another purpose, by adding the rigidity difference for correcting the rigidity difference of the piezoelectric element, the similar effect is obtained.

Sixteenth Embodiment

Figure 29:
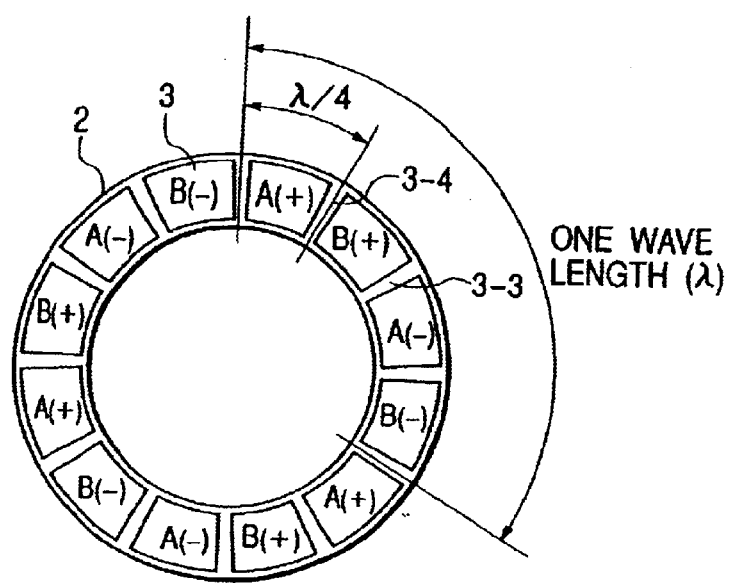
FIG. 29 is a plan view of the piezoelectric element showing a sixteenth embodiment.
Figure 30:
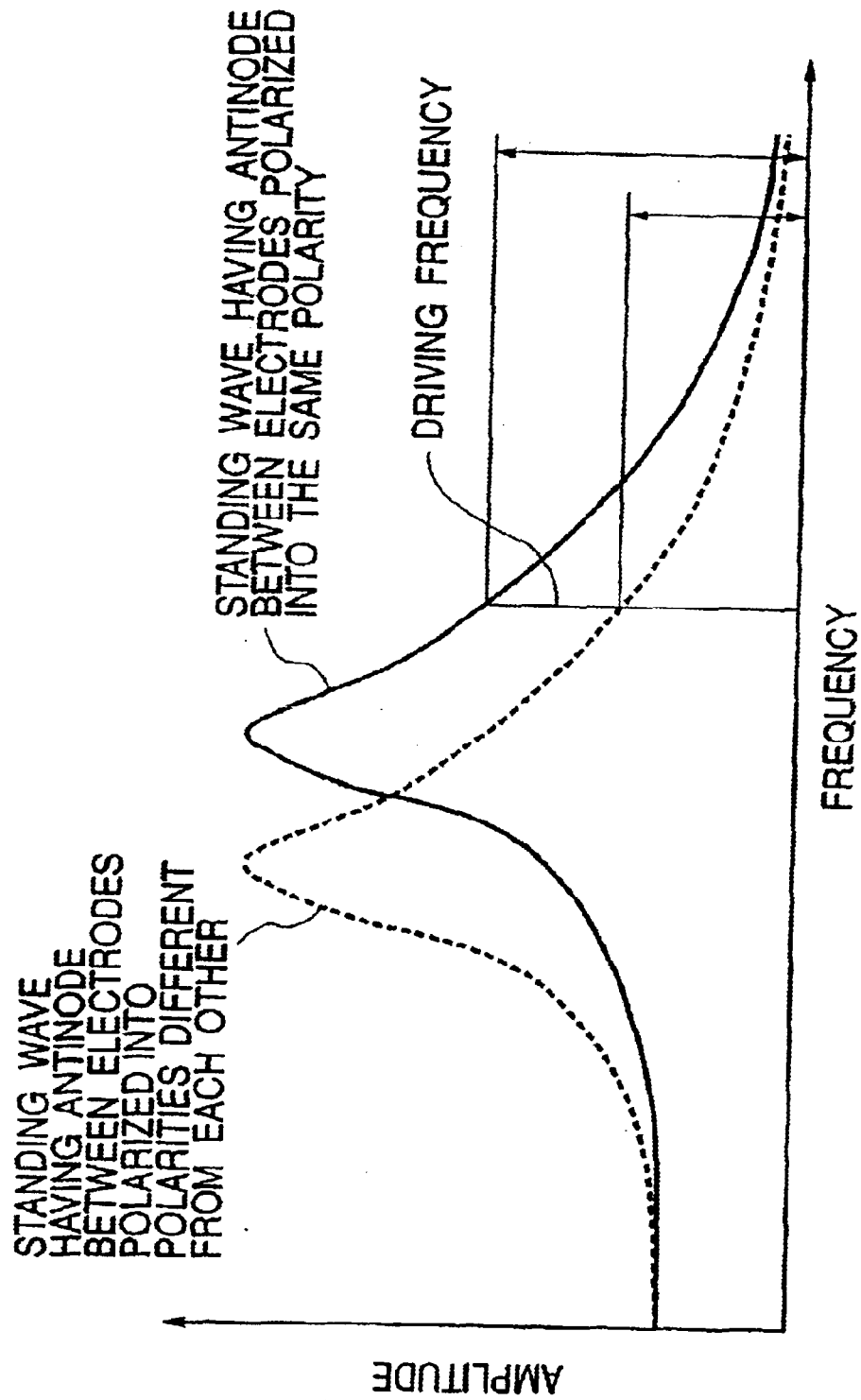
FIG. 30 is a chart showing a relation between frequency and amplitude in the sixteenth embodiment.

FIGS. 29 and 30 show a sixteenth embodiment of the present invention.

For the piezoelectric element of the embodiment shown in FIG. 2, the A and B groups of piezoelectric elements are distributed to the left and right sides, and the polarization directions of the adjacent electrode patterns are different from each other.

However, in the piezoelectric element of the present embodiment, as shown in FIG. 29, the A and B group electrodes are arranged to be adjacent to each other (the length of a pair of electrodes is one wavelength), and the polarization directions of the adjacent A and B group electrodes are different from each other.

In the present embodiment, the rigidity of the spacing 3-3 between the electrodes polarized in the different directions is smaller than that of a spacing 3-4 between the electrodes polarized in the same direction. Here, the standing wave excited by applying a voltage to the A phase electrode is decomposed into a standing wave including the electrode spacing 3-4 as the antinode and a standing wave including the electrode spacing 3-3 as the antinode. When the electrode spacing 3-3 is the antinode, the flexural rigidity is lowered. For the vibration amplitude to the applied voltage, as shown in FIG. 30, a resonance frequency drops. During driving with a frequency higher than the resonance frequency, the amplitude of the standing wave having the antinode in the electrode spacing 3-4 increases. As a result, for the standing wave obtained by excitation to the A phase, the amplitude of the component having the antinode in the electrode spacing 3-4 is large, and a vibration shape deviates and shifts toward the electrode spacing 3-4.

Similarly for the B phase, since the vibration shape deviates and shifts toward the electrode spacing 3-4, the position phase difference of A–B phases deviates from a predetermined wavelength $\lambda/4$, and a uniform amplitude cannot be obtained.

Even for the piezoelectric element, as in the aforementioned embodiment, the rigidity of the vibration member may be uniform by providing the corresponding portion of the elastic member with a non-uniform rigidity, or the rigidity of the vibration member may be uniform by treating the piezoelectric element itself.

Seventeenth Embodiment

Figure 31A:
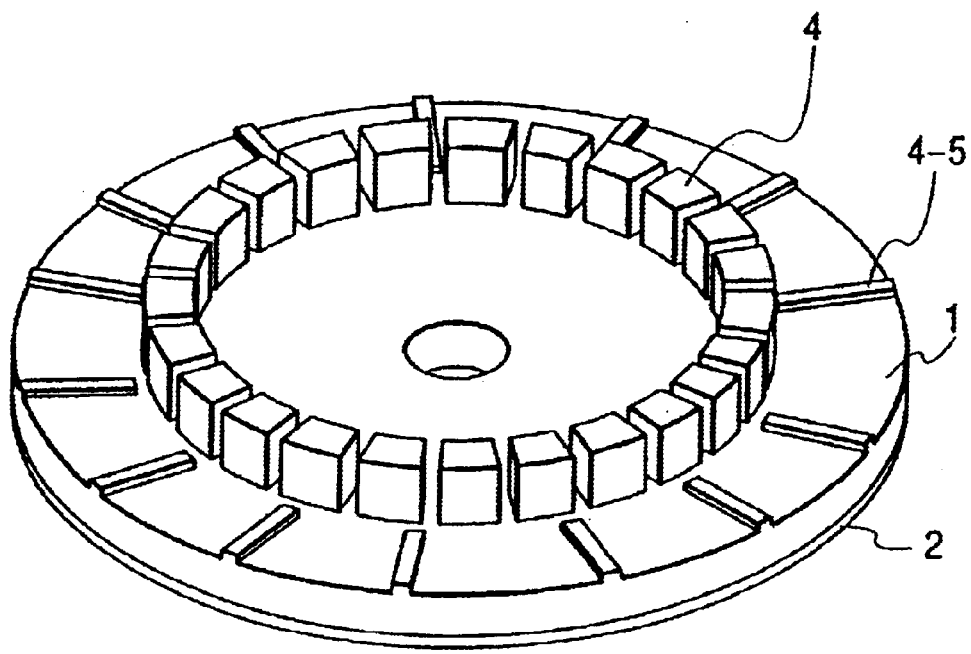
FIGS. 31A and 31B are perspective views of the vibration member showing a seventeenth embodiment.
Figure 31B:
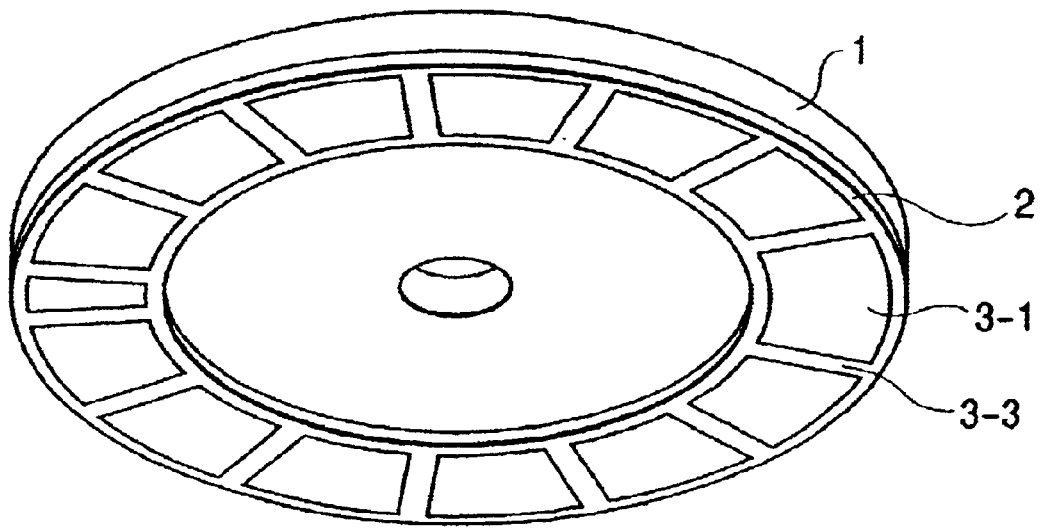

FIGS. 31A and 31B show a seventeenth embodiment of the present invention.

The vibration member of the present embodiment is constituted by bonding the piezoelectric element 2 to the disc-shaped elastic member 1, and driven in a diametrical direction in a primary mode.

In the elastic member 1, a plurality of displacement enlarging protrusions 4 are formed, piezoelectric element pattern electrodes 3-1 adjacent to each other are polarized in directions opposite to each other and in the thickness direction, and the flexural rigidity of the portion of the vibration member corresponding to the spacing 3-3 between the adjacent electrodes is smaller than that of another portion.

In the present embodiment, by disposing the protrusion-shaped rigidity ununiformity portion 4-5 in the angular and diametric position corresponding to the position of the electrode spacing 3-3 of the disc-shaped elastic member 1, the drop amount of the flexural rigidity of the piezoelectric element electrode spacing is compensated and the uniform vibration is obtained without any unevenness.

The rigidity ununiformity portion disposed on the elastic member 1 is also obtained by changing the depth of the groove between the adjacent protrusions as described in the first embodiment, and further obtained by forming non-uniform protrusion shapes.

Moreover, when a plurality of piezoelectric elements are arranged and driven on concentric circles, the rigidity ununiformity portion 4-5 of the elastic member 1 may be disposed in the angular and diametric position corresponding to the area between the electrodes polarized in the directions opposite to each other in each of the piezoelectric elements.

According to the aforementioned embodiments, the vibration member can output a stable driving vibration.

Moreover, in the vibration member of the annular or disc-shaped elastic member, the stable driving vibration can be outputted.

Furthermore, in the vibration member of the bar-shaped elastic member, the stable driving vibration can be outputted.

Additionally, the stable driving vibration can be obtained for the electro-mechanical energy conversion elements of various piezoelectric elements, and the like.

Moreover, even when a rigidity change occurs between the polarized areas of the electro-mechanical energy conversion element, the rigidity of the vibration member itself can be uniform, and the stable driving vibration can be outputted.

Furthermore, by making the rigidity of the elastic member non-uniform, the rigidity of the vibration member can be uniform.

Additionally, even when the rigidity change occurs between the polarized areas of the electro-mechanical energy conversion element, by devising the sectional shape of the electro-mechanical energy conversion element, the rigidity of the vibration member can be uniform.

Moreover, by utilizing the groove formed to enlarge the vibration displacement of the elastic member, for example, to form the groove to be shallower than usual, the partial ununiformity of the rigidity can be corrected.

Furthermore, even when the elastic member groove does not coincide in position with the electrode spacing of the electro-mechanical energy conversion element, by changing the depth of the peripheral groove, the rigidity of the vibration member can be uniform.

Additionally, instead of changing the groove depth, when the protrusion is formed to be smaller than another protrusion or varied in shape otherwise, the partial ununiformity of the rigidity can be corrected.

Moreover, there is also proposed a method of partially varying the rigidity without changing the depth of the elastic member groove.

Furthermore, a squeak or the like can be prevented from being generated.

Additionally, the change of the neutral axis of the vibration member can be reduced.

Moreover, there can be provided a vibration wave driving apparatus such as a vibration wave motor in which driving efficiency is enhanced, deviation friction can be prevented from being generated, and life is lengthened.

What is claimed is:

1. A vibration member comprising:
   an elastic member including a driving portion having a plurality of protrusions; and
   an electro-mechanical energy conversion element in contact with said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving vibration in said driving portion,
   wherein a rigidity of portions of said elastic member which are located between adjacent protrusions and which also are located between adjacent electrodes is larger than a rigidity of other portions of said elastic member which are located between adjacent protrusions but which are not also located between adjacent electrodes.

2. A vibration member comprising:
   an elastic member including a driving portion; and
   an electro-mechanical energy conversion element in contact with said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving vibration in said driving portion,
   wherein a cross-sectional area of portions of said elastic member which are located between adjacent protrusions and which also are located between adjacent electrodes is larger than a cross-sectional area of other portions of said elastic member which are located between adjacent protrusions but which are not also located between adjacent electrodes.

3. A vibration member comprising:
   an elastic member including a driving portion; and
   an electro-mechanical energy conversion element in contact with said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving vibration in said driving portion,
   wherein a density of portions of said elastic member located between said plurality of electrodes is set higher than a density of other portions of said elastic member so as to offset differences in the modulus of elasticity profile generated by the polarization process of said electro-mechanical energy conversion element.

4. A vibration member having an annular or disc shape, comprising:
   an elastic member including a driving portion having a plurality of protrusions, and having an annular or disc shape; and
   an electro-mechanical energy conversion element having an annular shape and bonded to one surface of said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to the electro-mechanical energy conversion element generates a plurality of vibrations in said elastic member, and where a combination of the plurality of vibrations generates a driving vibration in said driving portion,
   wherein a rigidity of portions of said elastic member which are located between adjacent protrusions and which also are located between adjacent electrodes is larger than a rigidity of other portions of said elastic member which are located between adjacent protrusions but which are not also located between adjacent electrodes.

5. A vibration member having an annular or disc shape, comprising:
   an elastic member including a driving portion having a plurality of protrusions, and having an annular or disc shape; and
   an electro-mechanical energy conversion element having an annular shape and bonded to one surface of said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving vibration in said driving portion, wherein a cross-sectional area of portions of said elastic member which are located between adjacent protrusions and which also are located between adjacent electrodes is larger than a cross-sectional area of other portions of said elastic member which are located between adjacent protrusions but which are not also located between adjacent electrodes.

6. A vibration member having an annular or disc shape, comprising:

an elastic member including a driving portion, and having an annular or disc shape; and an electro-mechanical energy conversion element having an annular shape and bonded to one surface of said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to the electro-mechanical energy conversion element generates a plurality of vibrations in said elastic member, and where a combination of the plurality of vibrations generates a driving vibration in said driving portion, wherein a density of portions of said elastic member located between said plurality of electrodes is set higher than a density of other portions of said elastic member so as to offset differences in the modulus of elasticity profile generated by the polarization process of said electro-mechanical energy conversion element.

7. A vibration member comprising:

an elastic member including plural elastic member portions and a driving portion; and an electro-mechanical energy conversion element held and fixed between said plural elastic member portions, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving vibration in said driving portion of said elastic member, wherein the rigidity of portions of said elastic member located between adjacent electrodes of said plurality of electrodes having different directions of polarization from each other is set larger than the rigidity of other portions of said elastic member so as to offset differences in the modulus of elasticity profile generated by the polarization process of said electro-mechanical energy conversion element.

8. A vibration member comprising:

an elastic member including plural elastic member portions and a driving portion; and an electro-mechanical energy conversion element held and fixed between said plural elastic member portions, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving-vibration in said driving portion, wherein portions of said elastic member located between said plurality of electrodes are cut out so as to offset differences in the modulus of elasticity generated by the polarization process of said electro-mechanical energy conversion element.

9. A vibration wave driving apparatus including said vibration member according to claim 1 and a contact member in press contact with said vibration member and movable relative to said vibration member by the driving force of said driving portion.

10. A vibration wave driving apparatus including said vibration member according to claim 2 and a contact member in press contact with said vibration member and moveable relative to said vibration member by a driving force of said driving portion.

11. A vibration wave driving apparatus including said vibration member according to claim 3 and a contact member in press contact with said vibration member and moveable relative to said vibration member by a driving force of said driving portion.

12. A vibration wave driving apparatus including said vibration member according to claim 4 and a contact member in press contact with said vibration member and moveable relative to said vibration member by a driving force of said driving portion.

13. A vibration wave driving apparatus including said vibration member according to claim 5 and a contact member in press contact with said vibration member and moveable relative to said vibration member by a driving force of said driving portion.

14. A vibration wave driving apparatus including said vibration member according to claim 6 and a contact member in press contact with said vibration member and moveable relative to said vibration member by a driving force of said driving portion.

15. A vibration wave driving apparatus including said vibration member according to claim 1 and a contact member in press contact with said vibration member through a fluid, said contact member being moveable relative to said vibration member by a driving force of said driving portion.

16. A vibration wave driving apparatus including said vibration member according to claim 4 and a contact member in press contact with said vibration member through a fluid, said contact member being moveable relative to said vibration member by a driving force of said driving portion.

17. A vibration wave driving apparatus including said vibration member according to claim 2 and a contact member in press contact with said vibration member through a fluid, said contact member being moveable relative to said vibration member by a driving force of said driving portion.

18. A vibration member according to claim 1, wherein adjacent electrodes have different directions of polarization.

19. A vibration member according to claim 2, wherein adjacent electrodes have different directions of polarization.

20. A vibration member according to claim 3, wherein adjacent electrodes have different directions of polarization.

21. A vibration member according to claim 1, wherein the plurality of electrodes are formed by polishing and dividing said electro-mechanical energy conversion element.

22. A vibration member according to claim 2, wherein the plurality of electrodes are formed by polishing and dividing said electro-mechanical energy conversion element.

23. A vibration member according to claim 3, wherein the plurality of electrodes are formed by polishing and dividing said electro-mechanical energy conversion element.

24. A vibration member according to claim 1, wherein said electro-mechanical energy conversion element is formed by a plurality of elements.

25. A vibration member according to claim 3, wherein said electro-mechanical energy conversion element is formed by a plurality of elements.

26. A vibration member according to claim 2, wherein among grooves which are formed between adjacent protrusions, those grooves which also are located at positions between adjacent electrodes are more shallow than the other grooves.

27. A vibration member according to claim 3, wherein said elastic member is made of a material having pores, and a number of the pores in a portion of said elastic member located between said plurality of electrodes is set less than that in other portions of said elastic member.

28. A vibration member according to claim 3, wherein said elastic member is made of a material having pores, and the pores in a portion of said elastic member located between said plurality of electrodes are impregnated with a material having melting point which is lower than that of the other material of said elastic member.

29. A vibration member according to claim 4, wherein adjacent electrodes have different directions of polarization.

30. A vibration member according to claim 5, wherein adjacent electrodes have different directions of polarization.

31. A vibration member according to claim 6, wherein adjacent electrodes have different directions of polarization.

32. A vibration member according to claim 4, wherein the plurality of electrodes are formed by polishing and dividing said electro-mechanical energy conversion element.

33. A vibration member according to claim 5, wherein the plurality of electrodes are formed by polishing and dividing said electro-mechanical energy conversion element.

34. A vibration member according to claim 6, wherein the plurality of electrodes are formed by polishing and dividing said electro-mechanical energy conversion element.

35. A vibration member according to claim 4, wherein said electro-mechanical energy conversion element is formed by a plurality of elements.

36. A vibration member according to claim 6, wherein said electro-mechanical energy conversion element is formed by a plurality of elements.

37. A vibration member according to claim 5, wherein among grooves which are formed between adjacent protrusions, those grooves which also are located at positions between adjacent electrodes are more shallow than the other grooves.

38. A vibration member according to claim 6, wherein said elastic member is made of a material having pores, and a number of pores in a portion of said elastic member located between adjacent electrodes of said plurality of electrodes is set less than that in other portions of said elastic member.

39. A vibration member according to claim 6, wherein said elastic member is made of a material having pores, and the pores in a portion of said elastic member located between adjacent electrodes of said plurality of electrodes are impregnated with a material having a melting point which is lower than that of other material of said elastic member.

40. A vibration member according to claim 4, wherein said electro-mechanical energy conversion element has a plurality of electrodes provided in a peripheral direction, and a width in a radial direction of a portion between adjacent electrodes of the plurality of electrodes is set larger than that of an electrode.

41. A vibration member comprising:

an elastic member including a driving portion having a plurality of protrusions; and an electro-mechanical energy conversion element in contact with said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and a combination of the plurality of vibrations generates a driving vibration in said driving portion, wherein a rigidity of portions of said elastic member which are located at positions of said protrusions and which also are located between adjacent electrodes is larger than a rigidity of other portions of said elastic member which are located at positions of said protrusions but which are not also located between adjacent electrodes.

42. A vibration member comprising:

an elastic member including a driving portion having a plurality of protrusions; and an electro-mechanical energy conversion element in contact with said elastic member, said electro-mechanical energy conversion element having a plurality of electrodes, a corresponding plurality of polarized regions formed by a polarization process of said electro-mechanical energy conversion element, and a modulus of elasticity profile generated by the polarization process profile, where application of an alternating signal to said electro-mechanical energy conversion element generates a plurality of vibrations in said elastic member, and a combination of the plurality of vibrations generates a driving vibration in said driving portion, wherein a cross-sectional area of portions of said elastic member which are located at positions of said protrusions and which also are located between adjacent electrodes is larger than that of other portions of said elastic member which are located at positions of said protrusions but which are not also located between adjacent electrodes.

43. A vibration member according to claim 42, wherein among grooves which are formed between adjacent protrusions, those grooves which also are located at positions between adjacent electrodes are more shallow than the other grooves.

44. A vibration member comprising:

an elastic member including a driving portion having a plurality of protrusions; and an electro-mechanical energy conversion element in contact with said elastic member, said electro-mechanical energy conversion element having a plurality of electrodes, a corresponding plurality of polarized regions formed by a polarization process of said electro-mechanical energy conversion element, and a modulus of elasticity profile generated by the polarization process, where application of an alternating signal to said electro-mechanical energy conversion element generates a plurality of vibrations in said elastic member, and where a combination of the plurality of vibrations generates a driving vibration in said driving portion, wherein a density of portions of said elastic member which are located between adjacent protrusions and which also are located between adjacent electrodes is higher than a density of portions of said elastic member which are located between adjacent protrusions but which are not also located between adjacent electrodes.

45. A vibration member having an annular or disc shape, comprising:

an elastic member including a driving portion having a plurality of protrusions, and having an annular or disc shape; and an electro-mechanical energy conversion element having an annular shape and bounded to one surface of said elastic member, said electro-mechanical energy conversion element having a plurality of electrodes, a corresponding plurality of polarized regions formed by a polarization process, where application of an alternating signal to the electro-mechanical energy conversion element generates a plurality of vibrations in said elastic member, and where a combination of the plurality of vibrations in said elastic member, and where a combination of the plurality of vibrations generates a driving vibration in said driving portion, wherein a density of portions of said elastic member which are located between adjacent protrusions and which also are located between adjacent electrodes is higher than a density of portions of said elastic member which are located between adjacent protrusions but which are not also located between adjacent electrodes.

46. A vibration member according to claim 1, wherein a groove is formed on said elastic member so as to generate a difference in a natural frequency of a plurality of vibration series which forms a vibration mode having a degree different from that of the driving vibration.

47. A vibration member according to claim 2, wherein a groove is formed on said elastic member so as to generate a difference in a natural frequency of a plurality of vibration series which forms a vibration mode having a degree different from that of the driving vibration.

* * * * *

UNITED STATES PATENT AND TRADEMARK OFFICE
CERTIFICATE OF CORRECTION

PATENT NO. : 6,674,217 B1
APPLICATION NO. : 09/625851
DATED : January 6, 2004
INVENTOR(S) : Kosuke Fujimoto It is certified that error appears in the above-identified patent and that said Letters Patent is hereby corrected as shown below:

COLUMN 9:
Line 50, "different" should read --difference--.

COLUMN 15:
Line 40, (Close up right margin).
Line 41, (Close up right margin).

Signed and Sealed this

Twenty-second Day of January, 2008

JON W. DUDAS
*Director of the United States Patent and Trademark Office*